(12) United States Patent
Houser et al.

(10) Patent No.: US 11,034,085 B2
(45) Date of Patent: Jun. 15, 2021

(54) SYSTEM AND METHOD FOR ADDITIVE MANUFACTURE OF MEDICAL DEVICES

(71) Applicant: Ethicon LLC, Guaynabo, PR (US)

(72) Inventors: Kevin L. Houser, Springboro, OH (US); Peyton L. Hopson, Jacksonville, FL (US); Vincent H. Barre, Jacksonville, FL (US)

(73) Assignee: Cilag GmbH International, Zug (CH)

( * ) Notice: Subject to any disclaimer, the term of this patent is extended or adjusted under 35 U.S.C. 154(b) by 0 days.

(21) Appl. No.: 16/911,467

(22) Filed: Jun. 25, 2020

(65) Prior Publication Data

US 2020/0324471 A1  Oct. 15, 2020

Related U.S. Application Data

(63) Continuation of application No. 15/666,882, filed on Aug. 2, 2017, now Pat. No. 10,730,236.

(51) Int. Cl.
| | |
|---|---|
| *B29C 64/194* | (2017.01) |
| *B29C 64/209* | (2017.01) |
| *B29C 64/118* | (2017.01) |
| *B33Y 50/02* | (2015.01) |
| *B33Y 30/00* | (2015.01) |
| *B33Y 40/00* | (2020.01) |

(Continued)

(52) U.S. Cl.
CPC .......... *B29C 64/194* (2017.08); *B29C 64/118* (2017.08); *B29C 64/165* (2017.08); *B29C 64/209* (2017.08); *B29C 64/314* (2017.08); *B29C 64/393* (2017.08); *B29C 70/24* (2013.01); *B29C 70/38* (2013.01); *B29C 70/443* (2013.01); *B29C 70/48* (2013.01); *B33Y 10/00* (2014.12); *B33Y 30/00* (2014.12); *B33Y 40/00* (2014.12); *B33Y 50/02* (2014.12); *B29K 2105/106* (2013.01); *B29L 2031/753* (2013.01)

(58) Field of Classification Search
CPC ..... B33Y 10/00; B29C 64/118; B29C 64/194; B29C 64/314; B29C 64/16; B29C 70/443; B29C 70/48
See application file for complete search history.

(56) References Cited

U.S. PATENT DOCUMENTS

| | | | |
|---|---|---|---|
| 10,173,410 B2 * | 1/2019 | Nardiello | B29C 48/304 |
| 2002/0062909 A1 * | 5/2002 | Jang | B33Y 30/00 156/155 |

(Continued)

*Primary Examiner* — Nahida Sultana
(74) *Attorney, Agent, or Firm* — Frost Brown Todd LLC

(57) ABSTRACT

An additive manufacturing system is capable of extruding poly-fiber strand having a fiber core coated with a polymer with a high range of flexibility in positioning and orienting extruded fibers. Extruded fibers may be laid in a single direction, or may curve or turn to be laid in multiple directions. Structures of devices and components may be created using interconnected extruded strands having interstitial spaces between and around the strands. This structure may be infused with resin or polymer using a pressure or vacuum based infusion system. In this manner, durable polymeric objects can be created without requiring expensive molds. Other techniques are also possible, including varying the types of strands used in an object to create areas of the object that will preferentially twist or flex in certain ways or directions, as well as producing objects with zones having different types of resin or no resin.

20 Claims, 23 Drawing Sheets

(51) Int. Cl.
*B29C 70/38* (2006.01)
*B29C 70/24* (2006.01)
*B29C 70/44* (2006.01)
*B33Y 10/00* (2015.01)
*B29C 64/314* (2017.01)
*B29C 64/393* (2017.01)
*B29C 64/165* (2017.01)
*B29C 70/48* (2006.01)
*B29K 105/10* (2006.01)
*B29L 31/00* (2006.01)

(56) References Cited

U.S. PATENT DOCUMENTS

| | | | |
|---|---|---|---|
| 2004/0067364 A1* | 4/2004 | Ishikawa | B32B 5/26 |
| | | | 428/411.1 |
| 2014/0232035 A1* | 8/2014 | Bheda | B29C 64/165 |
| | | | 264/148 |
| 2015/0230802 A1* | 8/2015 | Lagodzki | A61B 17/12109 |
| | | | 606/200 |
| 2020/0114539 A1* | 4/2020 | Shim | C04B 35/573 |
| 2020/0114578 A1* | 4/2020 | Azarov | B29C 64/295 |
| 2020/0230878 A1* | 7/2020 | Azarov | B29C 64/188 |
| 2020/0238636 A1* | 7/2020 | Stephenson | B29C 70/443 |
| 2020/0324462 A1* | 10/2020 | Newell | B33Y 10/00 |
| 2020/0406542 A1* | 12/2020 | Bennett | B29C 64/20 |
| 2021/0031395 A1* | 2/2021 | Waldrop, III | B29C 64/165 |

* cited by examiner

SYSTEM AND METHOD FOR ADDITIVE MANUFACTURE OF MEDICAL DEVICES

PRIORITY

This application is a continuation of U.S. patent application Ser. No. 15/666,882, entitled "System and Method for Additive Manufacture of Medical Devices," filed Aug. 2, 2017, and published as U.S. Pat. Pub. 2019/0039297 on Feb. 7, 2019, issued as U.S. Pat. No. 10,730,236 on Aug. 4, 2020, the entire disclosure of which is incorporated by reference herein.

FIELD

The disclosed technology pertains to a system for additive manufacturing of devices, components, and other objects.

BACKGROUND

Due to the applications and environments that they are used within, it may be advantageous for some medical devices to be manufactured using polymeric materials instead of metal. The use of polymeric materials may allow for reduced cost of acquiring materials, reduced cost of processing raw materials, or both. Polymeric materials may have additional advantages, including reduced weight, which may be desirable for implants, prosthetics, and hand-held tools, a reduced change of allergic reaction or related reactions in the case of implants and prosthetics, and improved resistance to rust, corrosion, and other wear that may occur when used in biological applications.

A limitation of polymeric materials that has limited their widespread use is a decreased mechanical strength relative to metallic materials. The strong forces that tools, implants, prosthetics and other objects undergo during use may cause conventional polymeric components to fail in ways that may be dangerous and unpredictable. Even where traditional polymeric components may meet the requirements for mechanical strength, their cost advantages may go unrealized, especially in cases where they are only needed in limited quantities. For example, polymeric components that are mass produced may be able to spread the cost of custom molds used during their manufacture across many produced items, whereas custom implants or prosthetics that require a unique mold may only be able to spread those costs over a handful of produced items.

Additive manufacturing techniques may be used to produce medical devices that achieve the benefits noted above, while also enabling the customization of medical devices such that a given medical device may be structurally configured ad hoc based on anatomy and/or needs of the particular patient for whom the medical device will be used. What is needed, therefore, is an improved system for the additive manufacture of medical devices.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
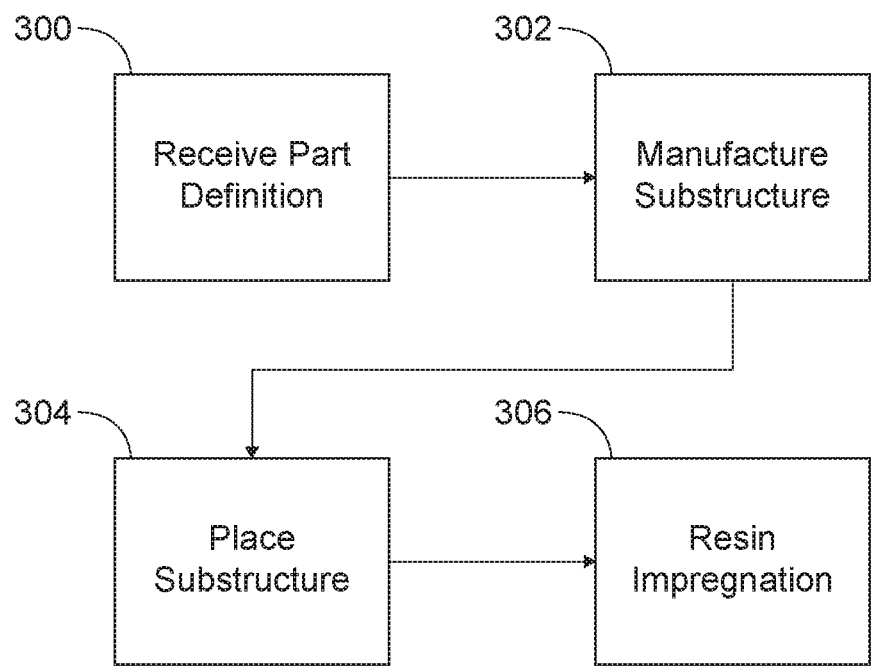
FIG. 1 is a flowchart of a set of high-level steps in an exemplary method that could be performed by or with a system to additively manufacture a piece.

The inventors have conceived of novel technology that, for the purpose of illustration, is disclosed herein as applied in the context of systems and techniques for additive manufacturing. While the disclosed applications of the inventors' technology satisfy a long-felt but unmet need in the art of additive manufacturing, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The disclosed technology may be used to additively manufacture medical devices or components of medical devices from polymeric materials rather than metallic materials. The strengths and structural characteristics of produced devices may be varied throughout the structure to provide an elevated level of flexibility in some portions of the device and an elevated level of rigidity in others. Additive manufacturing of the devices requires a novel system that is capable of performing a pultrusion process to extrude a polymer coated fiber (poly-fiber) that may be bound with other poly-fibers through the heating and cooling of the polymer coating. As each length of extruded poly-fiber is placed, a cutter placed proximately to the extrusion nozzle cuts the extruded poly-fiber. In this manner, a porous substructure of the device may be created from one or more types of poly-fibers. The extrusion nozzle is capable of a wide range of movement and rotation to allow for devices of various size and structure to be manufactured, and to allow for a wide range of poly-fiber directionality, which allows for optimization of force vectors within the devices structure. The completed substructure then undergoes a resin impregnation process that fills the porous areas of the substructure with one or more types of polymeric materials that may be cured or hardened.

A variety of devices and components may be created from polymeric materials in this way, with the created devices having an increased strength and durability compared to molded polymer devices due to the embedded substructure, which may be custom designed for each device to provide favorable disposition and directionality of fibers for that device. Due to the range of options available in the types of fiber used (e.g., carbon, glass, aramid), the types of polymers used, and the flexibility of fiber disposition and directionality, the types of devices or components that may be produced in this manner are nearly limitless.

As a few non-limiting examples, this could include custom designed or shaped surgical meshes or structures for hernia surgery similar to those offered under the names Prolene®, Mersilene®, and Ultrapro®, custom sized and shaped surgical meshes for uterine and pelvic surgery similar to those offered under the names Artisyn® and Gynecare Gynemesh®, custom sized and shaped pelvic implants such as those offered under the names Gynecare TVT Exact®, Gynecare TVT Abbrevo®, and Gynecare TVT™. This could also include custom sized and shaped grips, handles, or casings for surgical instruments such as those sold under the names Harmonic Wave®, Harmonic Synergy®, Enseal®, Echelon Flex™, Proximate®, and others, which could allow for those devices to be fitted with custom parts to provide a particular user a custom-fitted or desired grip, handle, shape, or size according to their preference. Other devices and components could include custom sized and shaped components of sinus catheter systems such as those sold under the name Relieva Ultirra®, custom sized and shaped hip implants such as those sold under the names Actis®, Corail®, Pinnacle®, Reclaim®, Summit®, and TriLock®, and other custom sized and shaped implants and fixation systems such as those sold under the names Biointrafix®, Femoral Intrafix™, Gryphon®, and Healix Advance™. Other devices and components that may advantageously be additively manufactured using one or more of the systems and techniques described herein will be apparent to those of ordinary skill in the art in light of the disclosure herein. It should also be understood that, when additive manufacturing is used to produce an ad hoc medical device (or an ad hoc component for a medical device), the medical device (or component thereof) may be customized based on the particular patient with whom the medical device will be used; and/or based on the particular physician who will be using the medical device.

Figure 4:
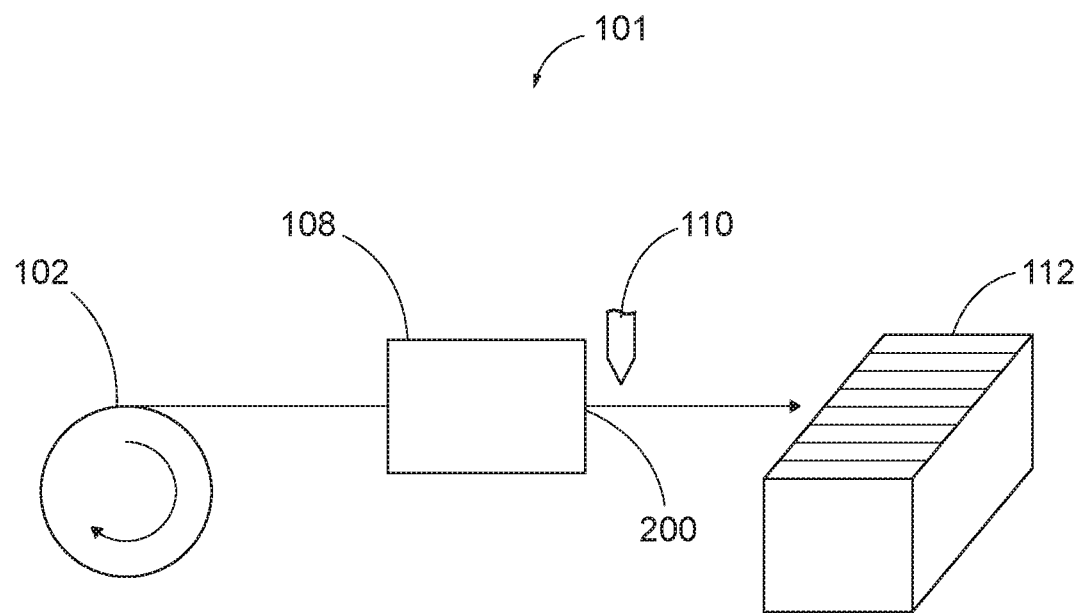
FIG. 4 is a schematic diagram of an exemplary additive manufacturing system that may be used to perform the method of FIG. 1.
Figure 5:
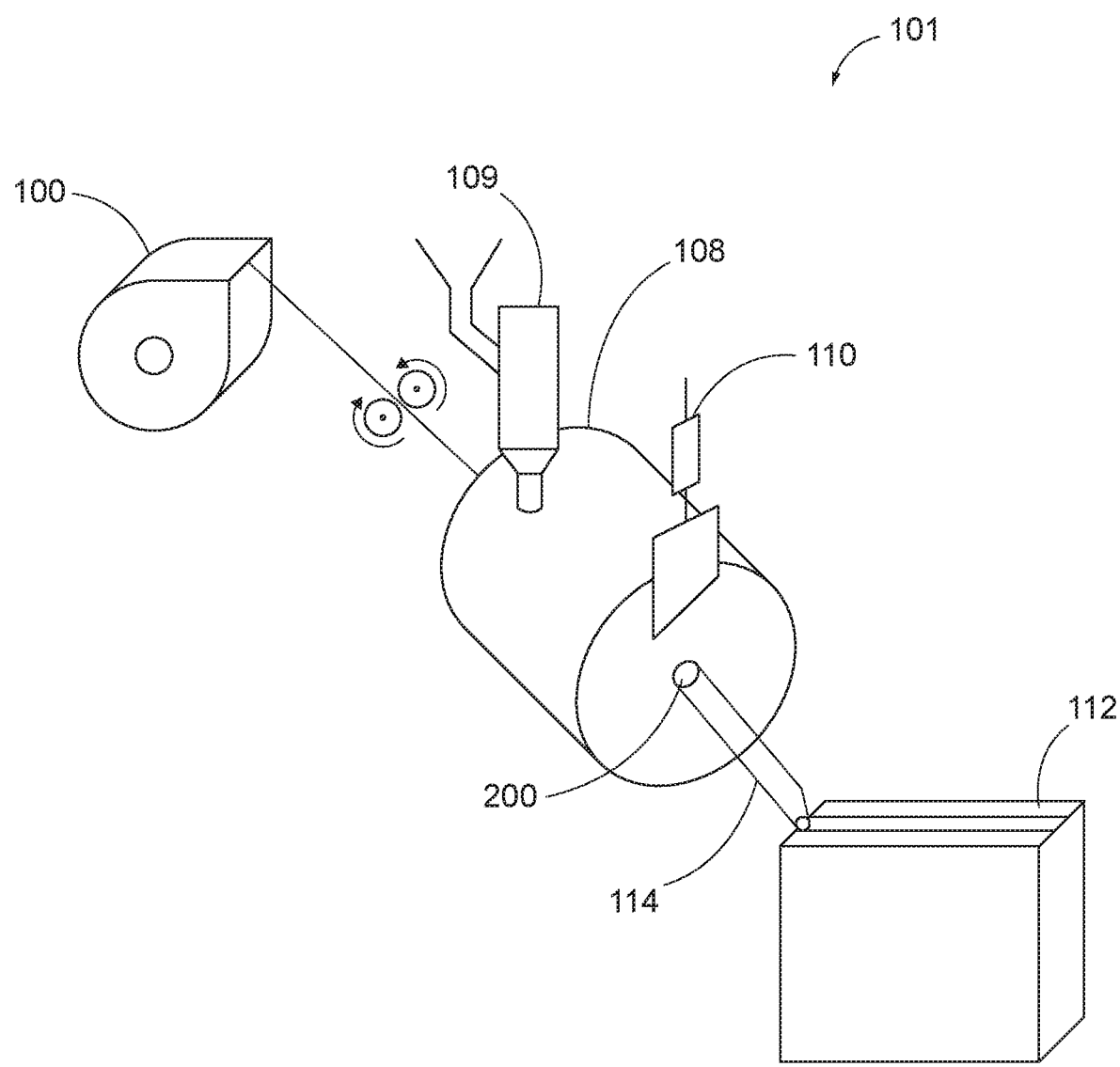
FIG. 5 is a schematic diagram of the additive manufacturing system of FIG. 1 and an exemplary manufactured piece.

FIG. 1 shows a set of high level steps that could be performed by or with an additive manufacturing system (101), such as that shown in FIGS. 4 and 5, to additively manufacture a device, component, part, or other object. Initially, a part definition will be received (block 300) by a controller or processor of the additive manufacturing system (101). The part definition will define the coordinates of a substructure or framework of the part. This will include the placement, orientation, length, and characteristics of poly-fibers that will make up the substructure, and will be in a format that may be interpreted by the controller or processor of the additive manufacturing system (101) and used by the additive manufacturing system (101) to position and orient the extrusion head (200), extrude one or more types of poly-fiber, and cut a recently extruded poly-fiber with a cutter (110) proximate to the extrusion head. Once received, the part definition will be used by the additive manufacturing system (101) to manufacture (block 302) the substructure by extruding poly-fiber one fiber and one layer at a time, with extruded poly-fibers building upon and adhering to previously placed fibers as the heated polymer coating cools and solidifies.

While the examples and descriptions herein refer to a substructure, it should be understood that the disclosed technology could also be used to create superstructures for objects, or structures that combine superstructures and substructures. For example, a produced superstructure could be a "skin" or outer-structure of an object that may undergo a resin impregnation process. In this manner, a porous superstructure that surrounds an interior hollow could be produced. During resin impregnation, the porous outer layer would form a poly-fiber reinforced skin that wraps around a resin filled hollow. Structures combining elements of superstructures and substructures are also possible. For example, a produced structure could have both a porous superstructure skin, and a porous substructure within. During resin impregnation, such a structure could have a poly-fiber reinforced skin that wraps around a poly-fiber reinforced interior, and may also contain resin filled hollow areas. As can be seen, this allows for great flexibility and variety in the types of structures that can be produced, and great flexibility in the characteristics of objects that can be produced by resin impregnation of these structures.

Once the manufactured substructure is completely placed, and fully cooled or solidified, the substructure may be placed (block 304) in a resin impregnation system. The particular actions involved in placement (block 304) will vary by the particular type of resin impregnation process. This could include a pressure resin impregnation process, whereby the substructure may be placed into a mold or bath and resin will be injected into the structure under pressure to push air out of the porous substructure and replace it with a liquid resin or polymer. This could also include a vacuum resin impregnation process, whereby the substructure may be placed into a bag or other air tight container with a liquid resin or polymer input, and then air may be forcefully removed from the porous substructure, which will cause the liquid polymer to be drawn into the porous substructure. So, in some cases placing (block 304) and preparing the substructure could include placing the substructure in a mold, resin bath, vacuum bag, or other container or system that a resin impregnation process might use. Once prepared, a resin impregnation process may be performed (block 306), which will generally involve removing air from the porous substructure and replacing it with a liquid resin or polymer. Once the resin impregnation process (block 306) is complete, and the liquid has cured or solidified, the result will be a hardened polymer part with an embedded substructure, with the overall shape of the part generally matching the shape of the substructure, the shape of a mold or vacuum bag used in the process, or both.

Figure 2:
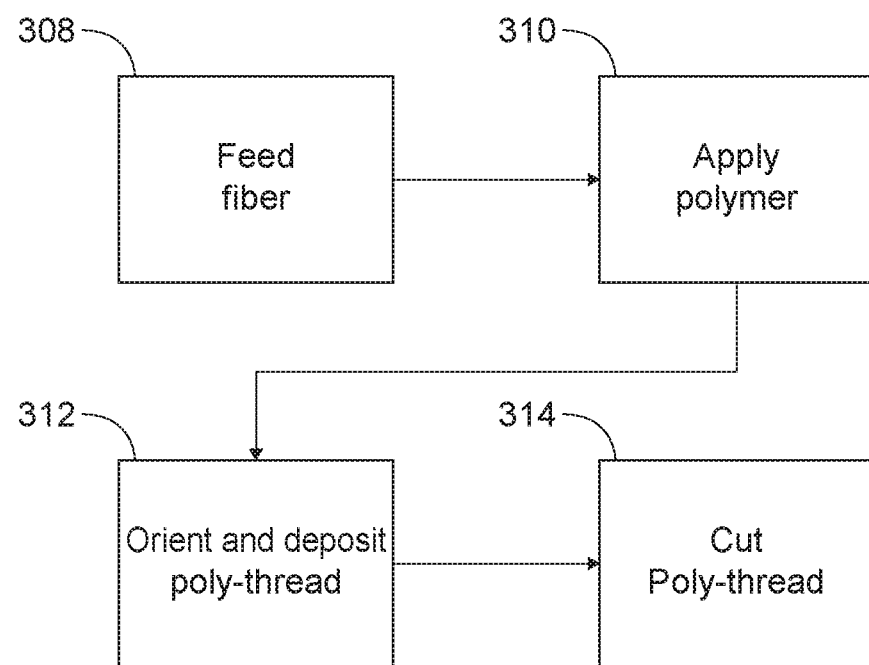
FIG. 2 is a flowchart of a set of exemplary sub-steps that could be performed within the method of FIG. 1 to create a substructure for the piece.
Figure 3:
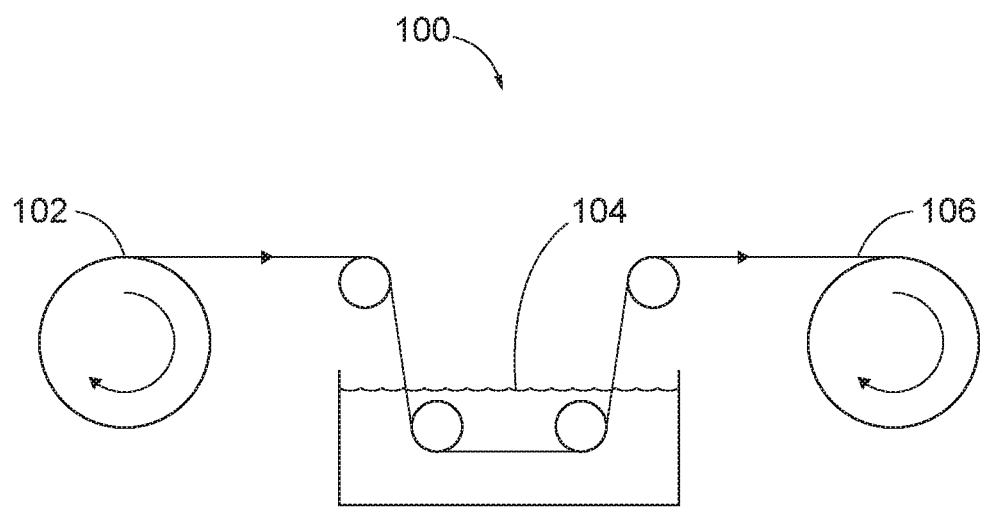
FIG. 3 is a schematic diagram of an exemplary feed system for feeding polymer coated fiber to an extrusion head of an additive manufacturing system that may be used to perform the method of FIG. 1.

FIG. 2 shows a set of high level steps that may be performed by an additive manufacturing system (101) to create a substructure or framework for the manufactured piece. Initially, strands of poly-fiber must be produced by feeding strands of fiber (block 308) and applying polymer (block 310) to the fiber as it is fed, in a technique known as pultrusion. FIG. 3 shows one example of a pultrusion feed system (100), comprising a fiber feed (102) that is a spool of fiber or a roller that pulls from a spool of fiber (block 308). As fiber is fed from the fiber feed (102), the fiber is pulled through a polymer bath (104) where a liquid polymer coats (block 310) the fiber strands. As the poly-fiber exits the polymer bath (104), a poly-fiber feed (106) spools and feeds, or feeds, the poly-fiber downstream. FIG. 4 shows an alternate implementation of the pultrusion system. That figure shows a fiber feed (102) that feeds fiber strands to a polymer die (108) that coats strands that are pulled through it with polymer.

Figure 6:
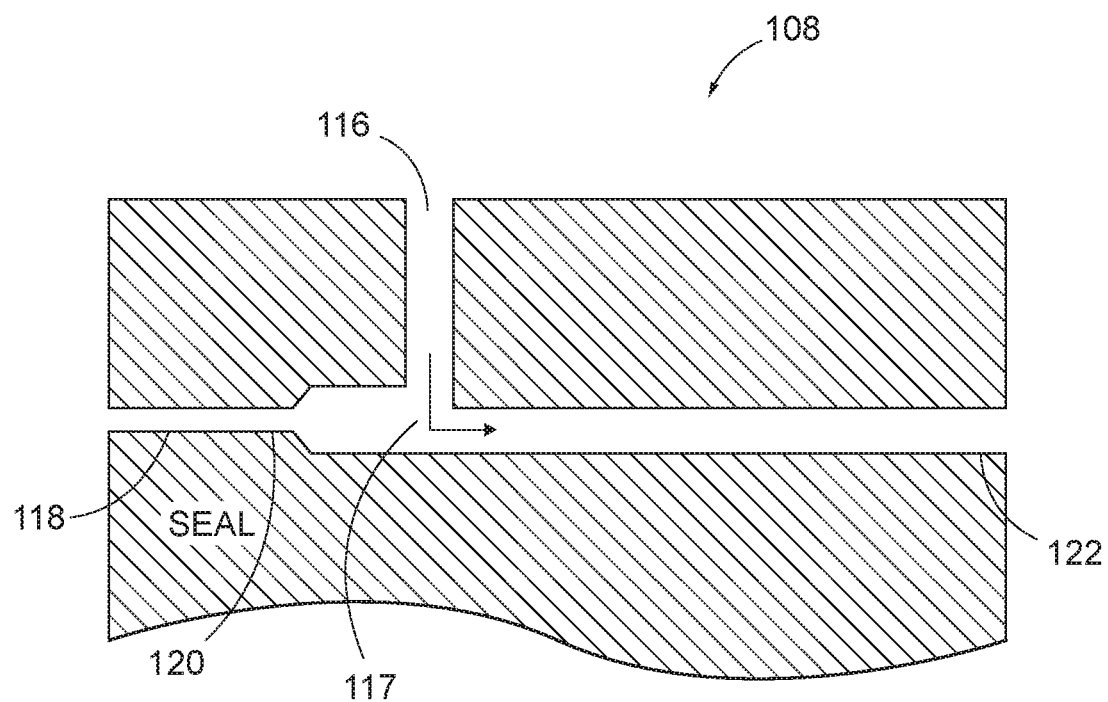
FIG. 6 is a cross section of an exemplary polymer die of the additive manufacturing system of FIG. 4.

FIG. 6 shows a cross-section view of the polymer die (108), which comprises a polymer input (116) that feeds into a primary channel (117), a fiber input (118) having a seal (120) allows fiber to pass into the primary channel (117) while preventing backflow of polymer into the fiber input (118), and a poly-fiber output (122) at the exit of the primary channel (117). Fiber may be fed into the polymer die (108) by one or more of being fed by a fiber feed (102), pulled through the polymer die by a spool or roller on the output (122) end of the polymer die (108), pulled through the polymer die (108) by the flow of injected polymer, or other feed methods. As the fiber is pulled through the polymer die (108), the fiber is coated in polymer that takes on the shape of the primary channel (117) of the polymer die (108). The polymer injection (116) may be combined with a heat source to heat the polymer at the injection point to improve flow, and the side walls of primary channel (117) will cool the polymer as it travels along the primary channel (117) by drawing heat out of the polymer and transferring it to the rest of the body of the polymer die (108).

The polymer bath pultrusion system of FIG. 3 may also be combined with the polymer die (108) shown in FIG. 6. For example, a polymer bath (104) could be used to apply a first type or application of polymer to the fiber, which could then be fed into the polymer die (108), where it could then receive a second type or application of polymer and be shaped in the primary channel (117), or could be heated and shaped in the primary channel (117), or both. This could allow different types of polymers to be applied in layers, or could allow the bulk of the polymer to be applied by the polymer bath (104) with a second application being injected into the polymer die (108), while allowing the produced poly-fiber to be heated and shaped by the mold so that the resulting poly-fiber is coated, sized, and shaped consistently.

The process of feeding (block 308) and coating (block 310) the poly-fiber can be performed at the same speed that the coated poly-fiber is extruded during manufacturing. In this manner, the extrusion head (200) can be positioned, oriented, and used to deposit (block 312) a recently coated length of poly-fiber while a subsequent length of fiber is being coated (block 310) with polymer. Positioning and orienting the extrusion head (200) may involve movement or rotation of one or more of a rastering system, a mechanical arm, or a manufacturing space platform to allow for up to six degrees of freedom for the extrusion head (200) within the manufacturing space both before and during extrusion of a poly-fiber. Extruded poly-fiber may be hot enough for the polymer coating to adhere as it exists the polymer die (108), or it may be re-heated by a heat source such as a heated surface or heated blower as it leaves the polymer die (108). The type of heat source and the heat needed to prepare the polymer coating for adhesion to other poly-fibers will vary based upon the particular type of fiber and polymer used, as well as the desired speed of extrusion. The initial strands or layers of poly-fiber may be extruded onto a flat or contoured surface of the manufacturing space, with subsequent layers being laid on top, adhering and then solidifying as they cool to form a permanent bond.

As the end point of each strand is deposited (block 312), a cutter (110) may be actuated to sever (block 314) the placed length of poly-fiber from the unplaced length of poly-fiber. The cutter (110) is located near the extrusion head (200), and may include, for example, a cutting blade that may be extended to press the poly-fiber against a cutting block and sever it, two cutting blades that extend and trap the poly-thread between them to sever it, three or more blades arranged so that that may be extended to trap the poly-fiber in a triangular, square, or other geometrical arrangement and sever it, one or more curved blades that may be extended towards each other or towards a cutting block to trap the poly-fiber and sever it, or a variation of any one or more of the above. Different arrangements of cutting blades and cutting surfaces will be advantageous for different types of fiber and polymer, and such variations will be apparent to one of ordinary skill in the art in light of the disclosure herein.

Figure 7:
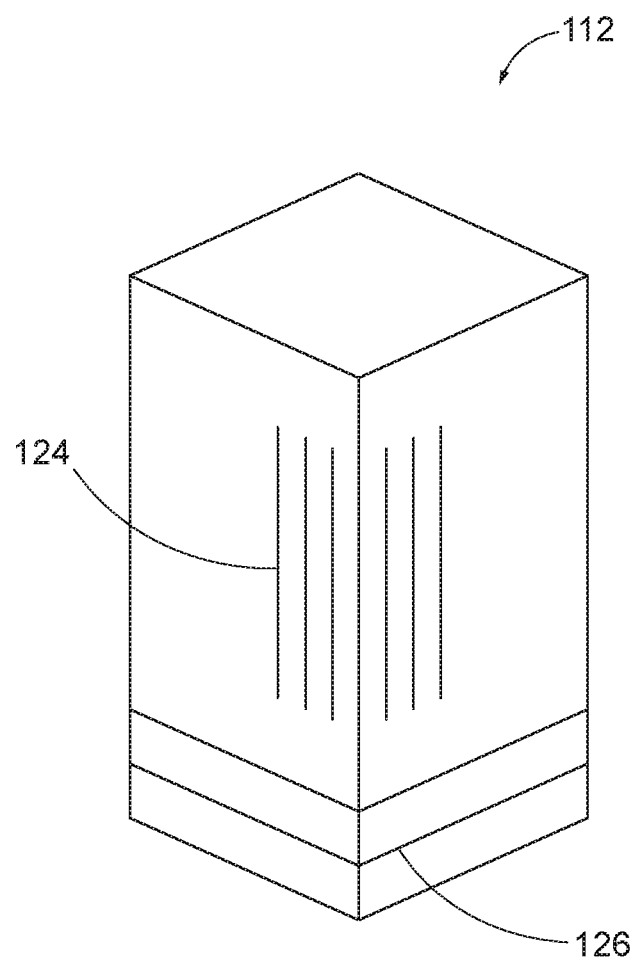
FIG. 7 is a front perspective view of the manufactured piece of FIG. 5.

FIG. 5 shows a diagrammatic view of the additive manufacturing system (101), where the extrusion head (200) is positioned and oriented to place a deposit strand (114) of poly-fiber (206) at a manufactured piece (112). FIG. 5 also shows a polymer injector (109) that may be used to inject polymer into the polymer die (108), heat polymer that is being injected into the polymer die (108) or that is already present in the polymer die (108) (i.e., is already coated on a fiber from a bath (100)), or both. FIG. 7 shows an example of a manufactured piece (112) that could be created using the additive manufacturing system (101). The structure of the poly-fibers and the high level of freedom with which the extrusion head (200) may be positioned and oriented allows for variable placement and directionality of the deposited poly fiber strands. For example, the manufactured piece (112) is created from a combination of rows of horizontally placed poly-fibers (126) and columns of vertically placed poly-fibers (124), that are adhered to each other by polymer coating that has been heated at deposit and then allowed to cool. This differs from conventional additive manufacturing techniques, which rely upon the repeated placement of a single texture filament in horizontal layers, and is made possible by both the structure provided by the poly-fiber compared to conventional filament, and the high degree of freedom of the extrusion head (200).

Figure 8:
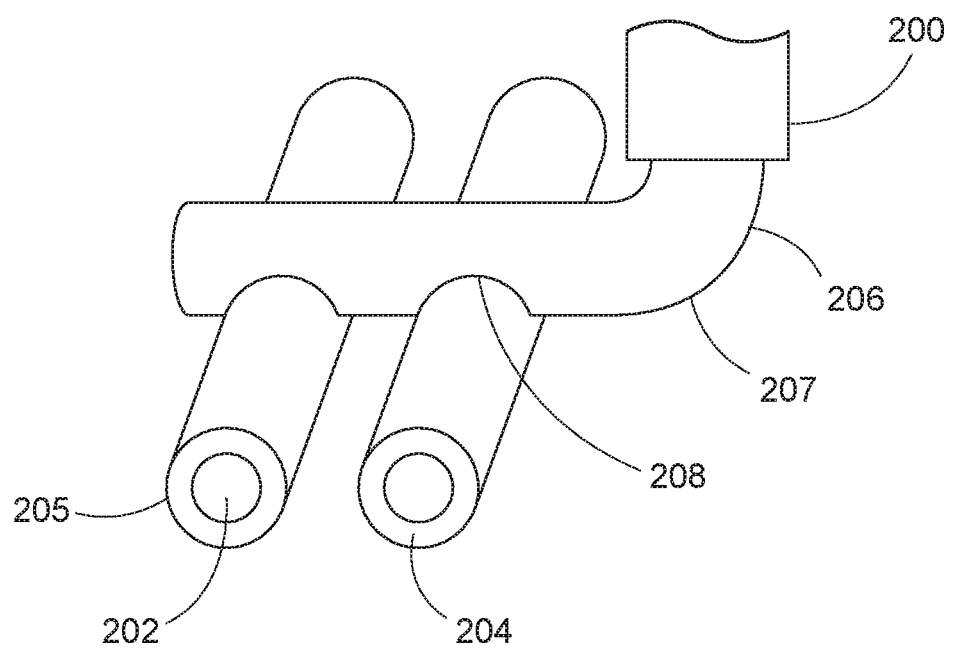
FIG. 8 is a front perspective view of several extruded poly-fibers during an additive manufacturing process.
Figure 9:
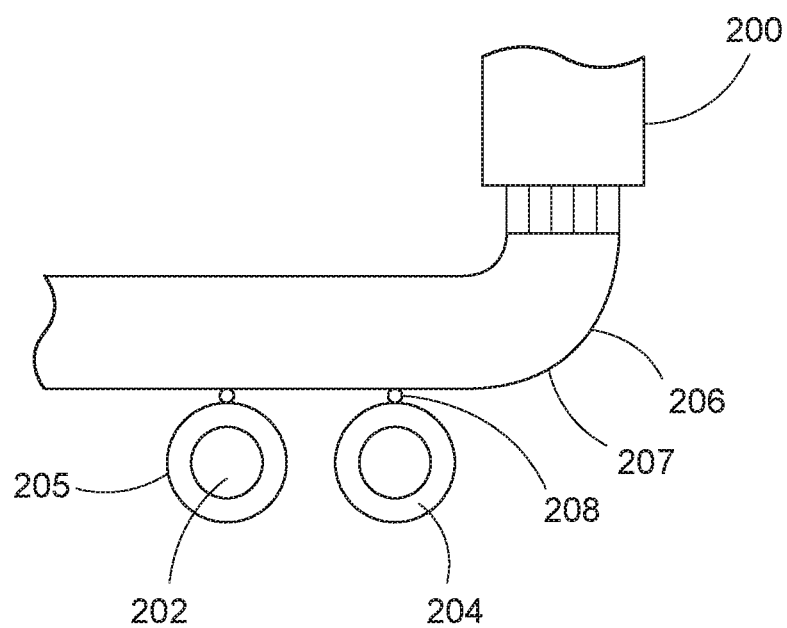
FIG. 9 is a side elevation view of the extruded poly-fibers of FIG. 8.

FIGS. 8 and 9 show examples of interconnected poly-fiber strands. The fiber material (202) and polymer layer (204) can be seen at the cut ends of the poly-fibers. An extruded poly-fiber (206) is shown being deposited by the extrusion head (200) so that extruded poly-fiber (206) lays across multiple base poly-fibers (205), and a bonding point (208) forms at each point where the extruded poly-fiber (206) touches a base poly-fiber (205). FIGS. 8 and 9 also show a direction change (207), where the extruded poly-fiber (206) may change direction during deposition. This is possible because the polymer casing is still in a molten state when the polymer casing is first deposited, but as the polymer casing cools it will stiffen and become less flexible. Cooling could occur naturally, or could occur due to directed blasts of cooling air from an external blower or a blower mounted proximately to the extrusion head (200). By extruding a length of poly-fiber (206) and allowing the extruded poly-fiber (206) cool to the point that it becomes less flexible, a change in directionality may occur (207) as shown in FIGS. 8 and 9.

Figure 10:
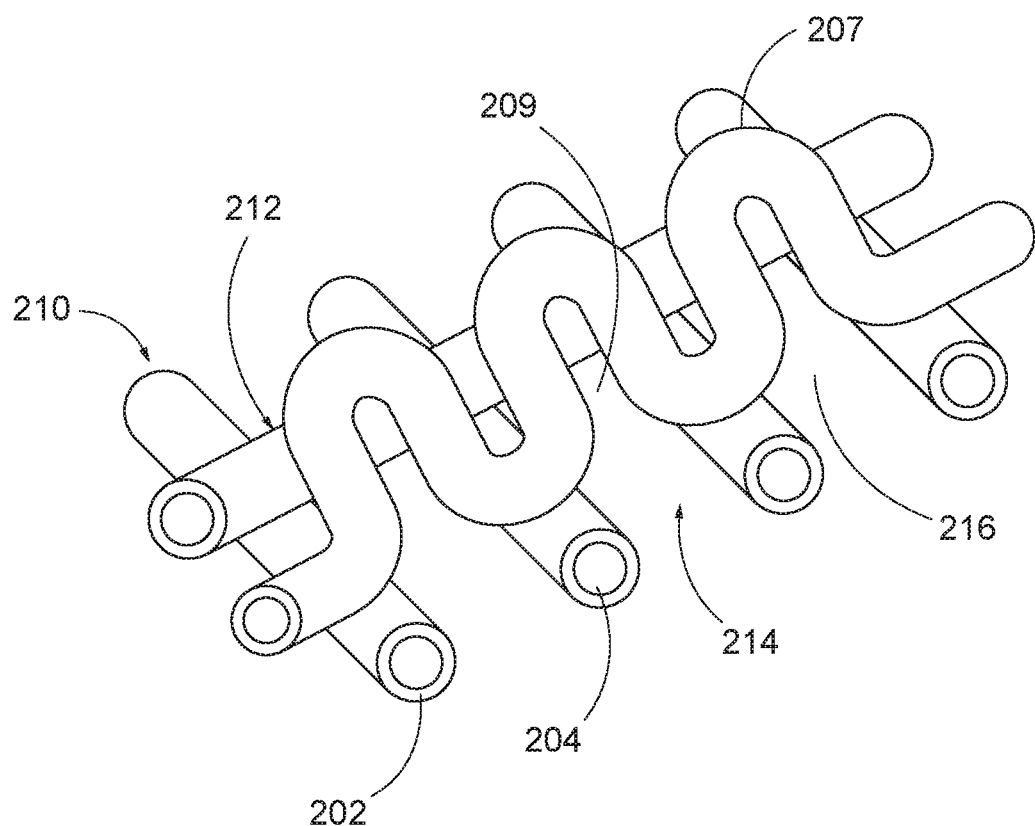
FIG. 10 a perspective view of several extruded and shaped poly-fibers during an additive manufacture process.

FIG. 10 shows a set of interconnected poly-fiber strands (214, 216) that include both unidirectional strands (214) and multidirectional strands (216). In the shown example, a grid of unidirectional strands (214) forms a first layer (210) and part of a second layer (212), which provides a stable area for a multidirectional strand (216) to be deposited. The multi-directional strand (216) is formed by depositing a poly-fiber strand onto the first layer (210), and positioning and orienting the extrusion head (200) throughout the deposition to include one or more directional changes (207). The advantage of including multi-directional strands in addition to a gridwork of unidirectional strands is that it provides an increased volume and variety of interstitial spaces (209) in the resulting part that may provide benefits when used as a substructure during a polymer or resin impregnation process (block 306). Being able to vary the directionality of strands (207), and the shape of the resulting interstitial spaces (209), allows the rigidity and flexibility of the resin-impregnated substructure to be customized as desirable.

Figure 11:
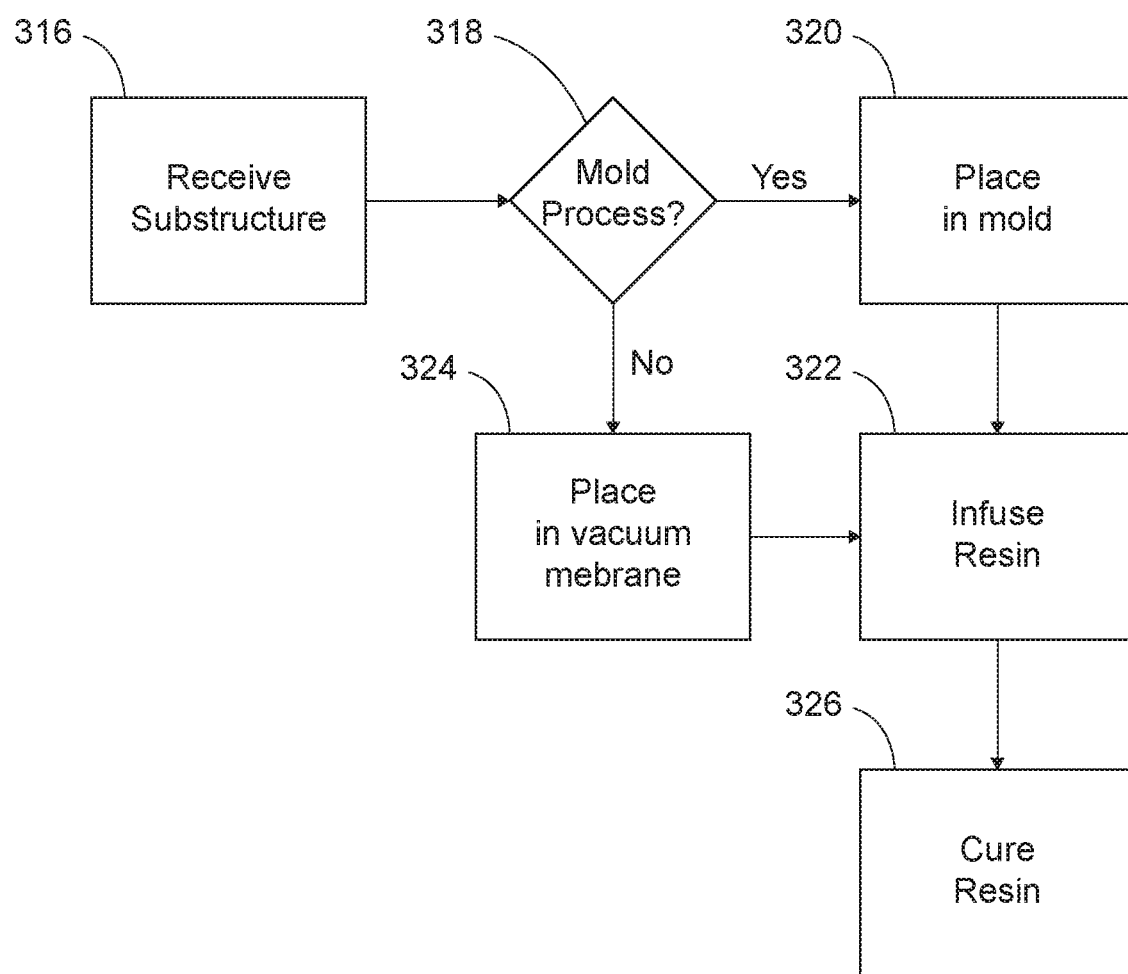
FIG. 11 is a flowchart showing an exemplary set of steps that the additive manufacturing system of FIG. 1 could perform to create a piece using an additively manufactured substructure.

With a customized substructure having been produced by the additive manufacturing system (101), a resin impregnation process may then be performed. As previously discussed, a variety of resin impregnation processes exist. FIG. 11 shows an example of two resin impregnation processes that might be used to fill a produced substructure. Once a substructure is prepared (block 316) for resin impregnation, it may be determined whether there is a mold available (block 318) that can be used for resin impregnation. This may be the case where, for example, the part being made is of a common size or shape, but a custom substructure has been produced in order to provide a customized level of flexibility or rigidity throughout the structure of the part. To further extend this example, a mold could also be used for a part with a structure having a combined superstructure and substructure. In this example, the superstructure or outer layer could have a shape and geometry that matches or fits within the mold, and the substructure could have a shape and geometry that matches of fits within the superstructure. These types of structures may be useful where varying internal geometries and characteristics of the substructure are desired. The superstructure will fit within the mold and provide an outer layer that is statically positioned relative to the mold, while the substructure within the superstructure can be statically positioned relative to the superstructure. In this way, unique and varied substructures can be produced and positioned anywhere within the superstructure, and can maintain that position during the resin impregnation process.

If a mold is available (block 318), the substructure can be placed (block 320) in the mold, which is partially sealed so that resin may be forced (block 322) into the mold so that it will fill the interstitial spaces of the substructure and remove the air within. After substantially all of the air has been forced out of the substructure, the resin may be cured by the passage of time, by a heating process, or by another curing process, depending upon the type and characteristics of the resin or polymer used.

Figure 12:
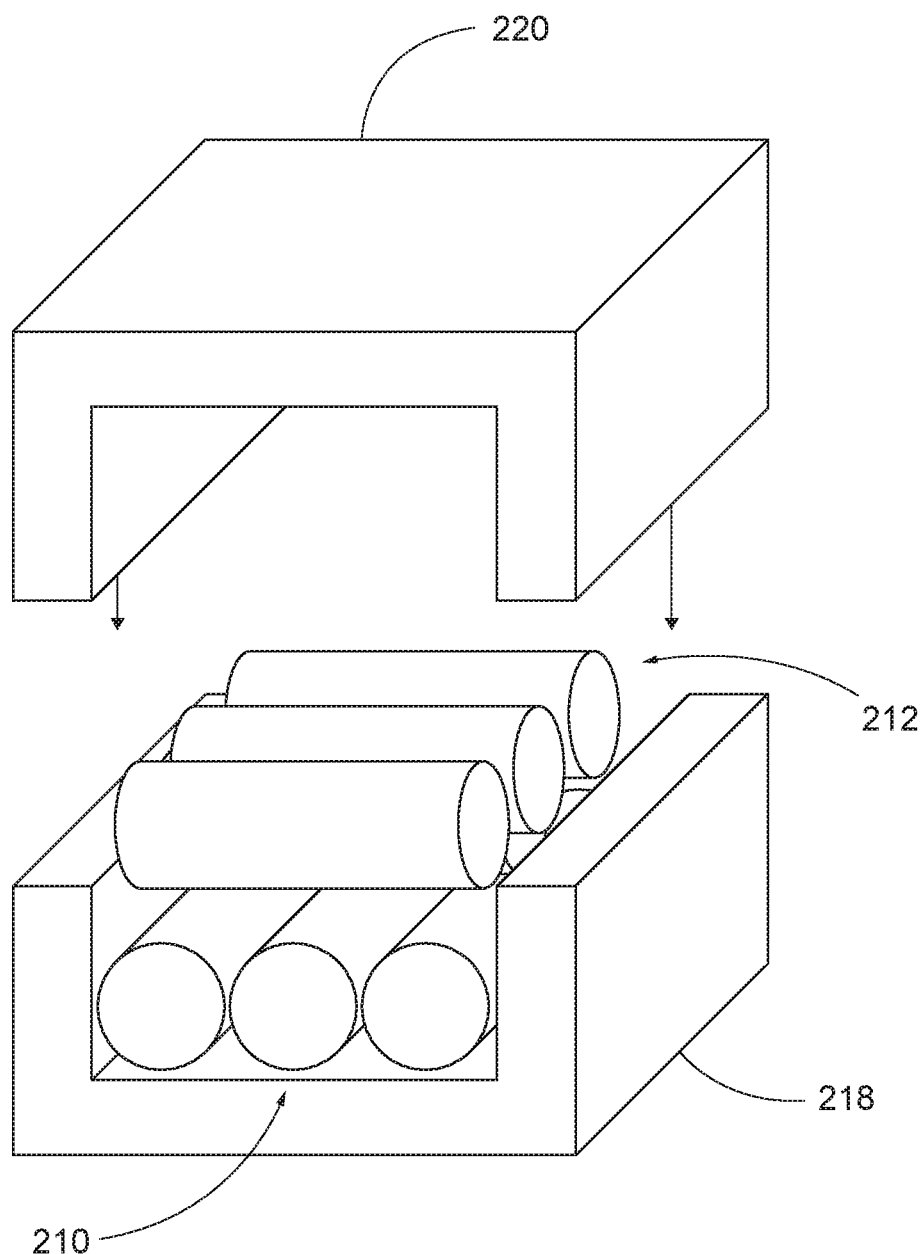
FIG. 12 is a front perspective view of an exemplary mold resin-transfer process at a first stage.
Figure 13:
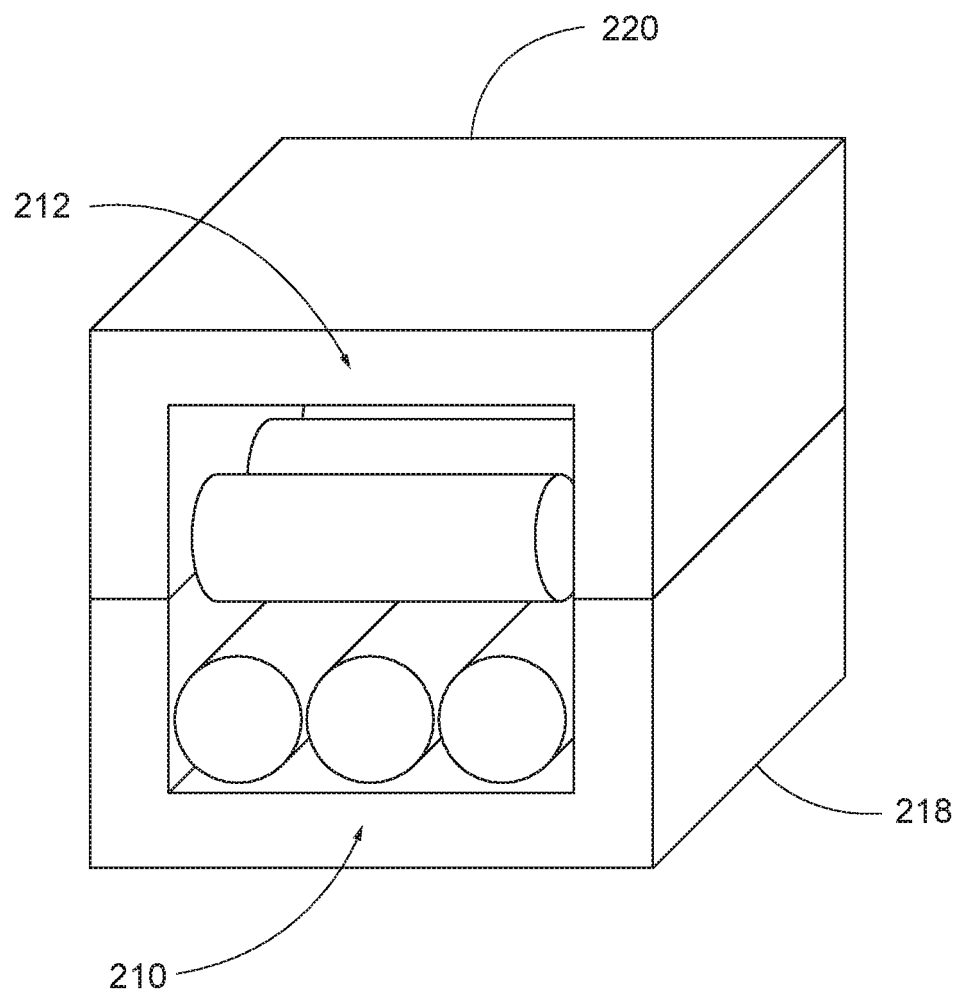
FIG. 13 is a front perspective view of the mold resin-transfer process of FIG. 12 at a second stage.
Figure 14:
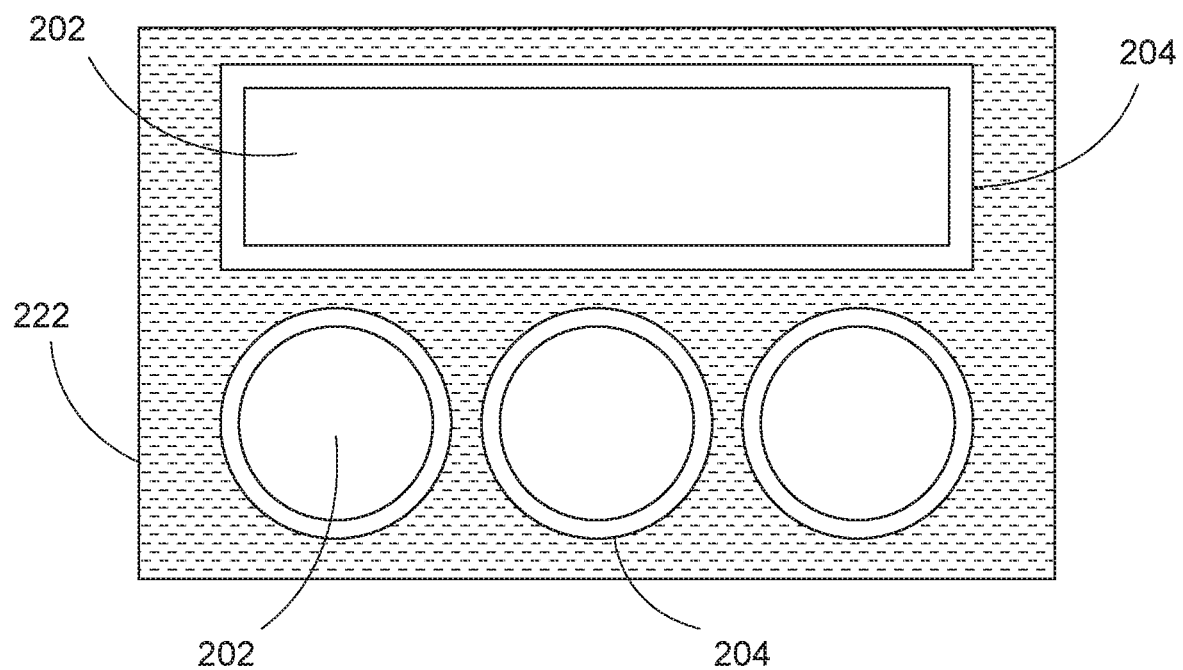
FIG. 14 is a side cross sectional view of an exemplary piece manufactured using the process of FIGS. 12 and 13.

FIG. 12 shows an example of a mold-based resin impregnation process being performed, with a cross sectional view to show the interior of the mold and part. In the shown example, a substructure having a first layer (210) and a second layer (212) of unidirectional strands, providing a grid of interstitial spaces, has been placed into a mold base (218), and a mold top (220) may be placed to seal the mold closed. Once the mold is closed, resin is forced into the mold under pressure, forcing the air out of the interstitial spaces, where it may be released through an air release or output that prevents backflow. FIG. 13 shows a cross section of the mold with resin filling the interstitial spaces of the substructure, and FIG. 14 shows a cross section of the completed part removed from the mold. As shown in FIG. 14, the interstitial spaces are now filled with infused resin (222).

If no mold is available (block 318), which may occur when the part being produced is of a unique size or shape, the substructure may instead be placed (block 324) into a vacuum bag and sealed. A vacuum source and a resin source are connected to the vacuum bag, so that when the vacuum source is activated the air is drawn from the interstitial spaces of the substructure, and resin is pulled (block 322) from the resin source to replace the displaced air. As with other processes, once the air has been fully removed, the resin impregnated part may be cured (block 326) as appropriate to complete the part.

Figure 15:
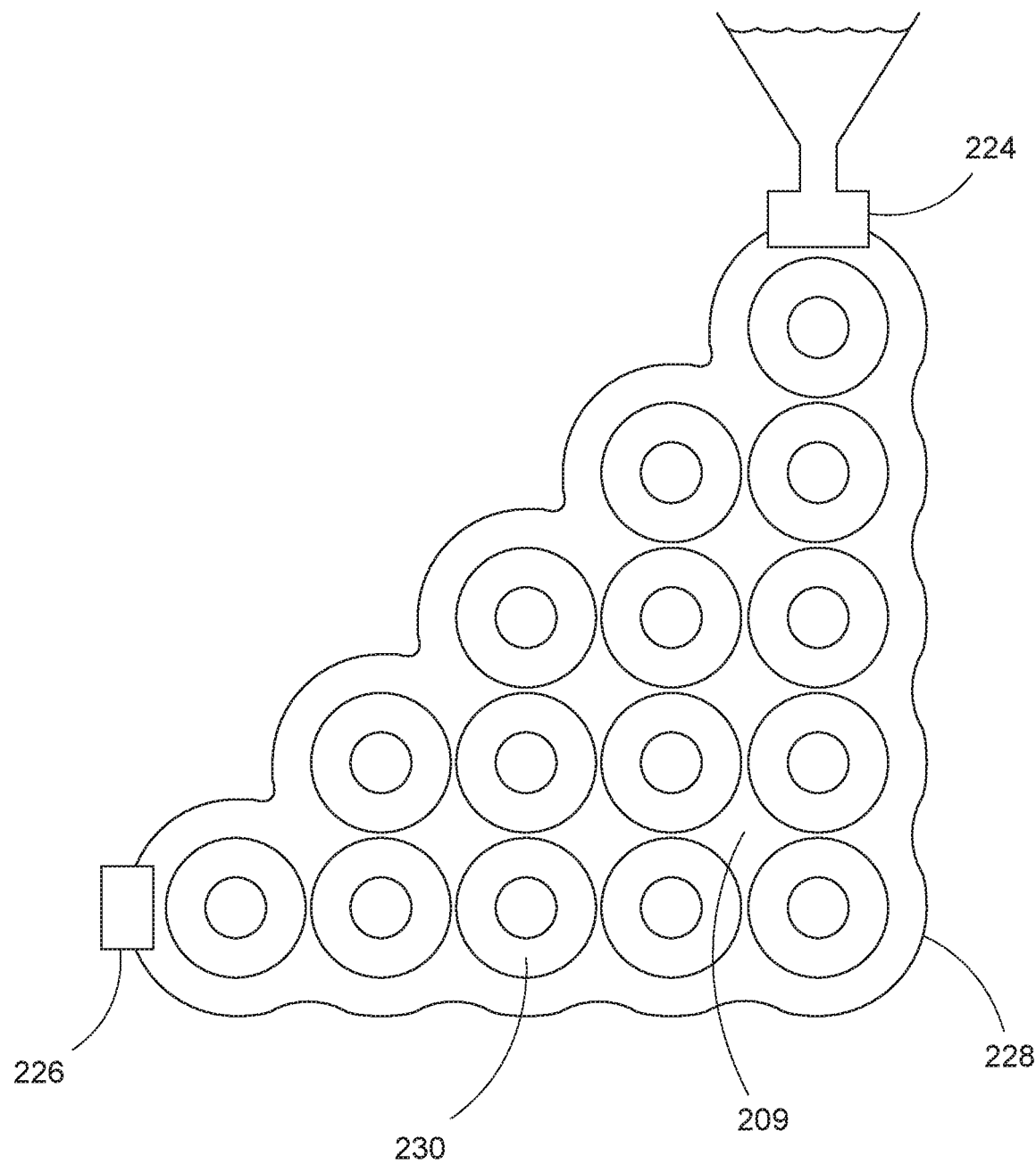
FIG. 15 is a side elevation view of an exemplary resin-infusion process.
Figure 16:
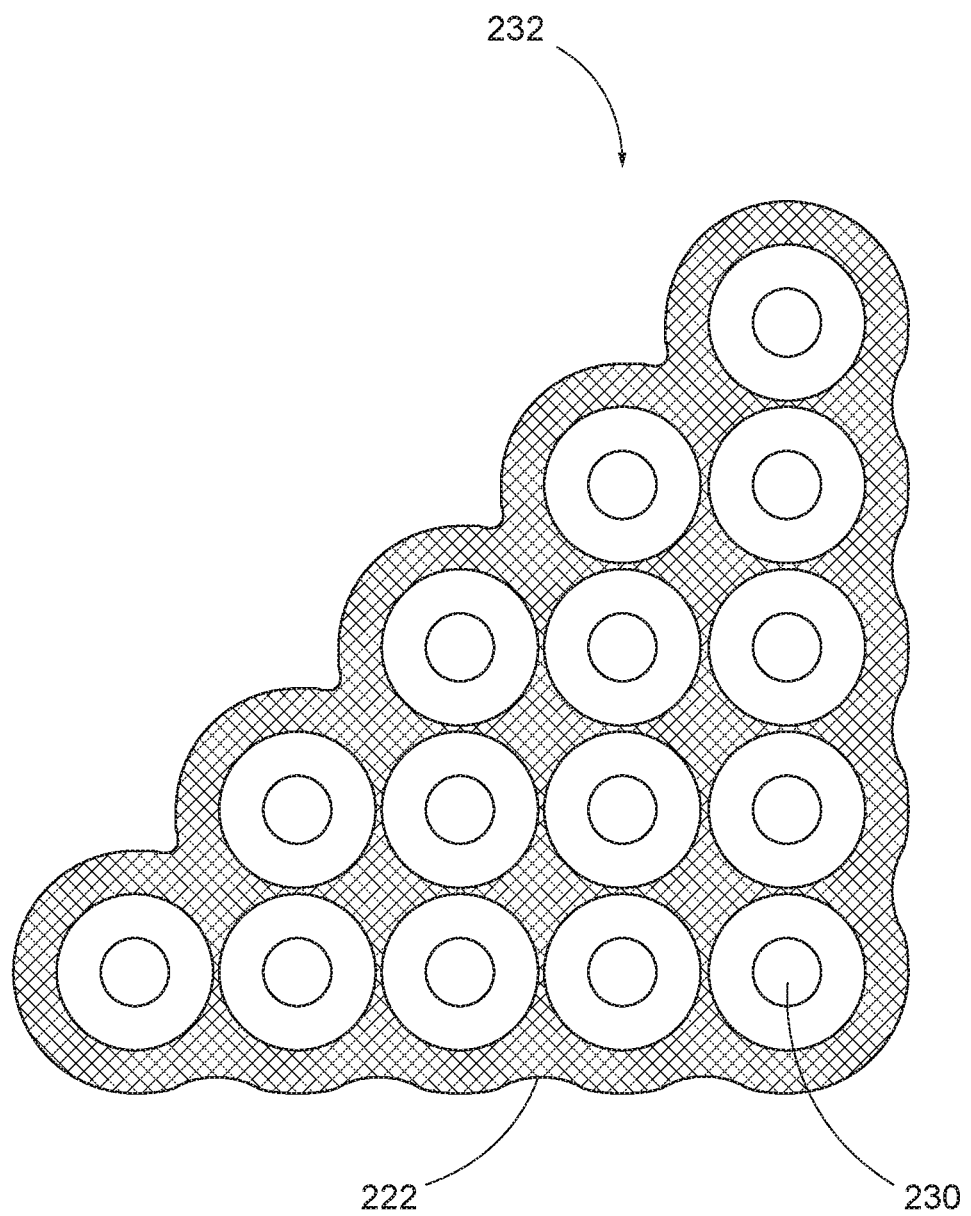
FIG. 16 is a side elevation view of an exemplary piece manufactured using the process of FIG. 15.

FIGS. 15 and 16 show an example of a vacuum based resin impregnation procedure. FIG. 15 shows a cross section of interconnected poly-fibers (230) contained within a vacuum membrane (228). The vacuum membrane (228) has a resin port (224) that is connected to a source of liquid resin or polymer, and a vacuum port (226) that is connected to a source of vacuum pressure. When vacuum pressure is applied through the vacuum port, air is removed from the interstitial spaces (207) and liquid resin is drawn from the resin port (224) to fill the interstitial spaces (207). FIG. 16 shows a manufactured piece (232) that has been removed from the vacuum membrane (228) after a resin impregnation process. The interstitial spaces (207) around the poly fibers (230) are now filled with infused resin (222).

Figure 17:
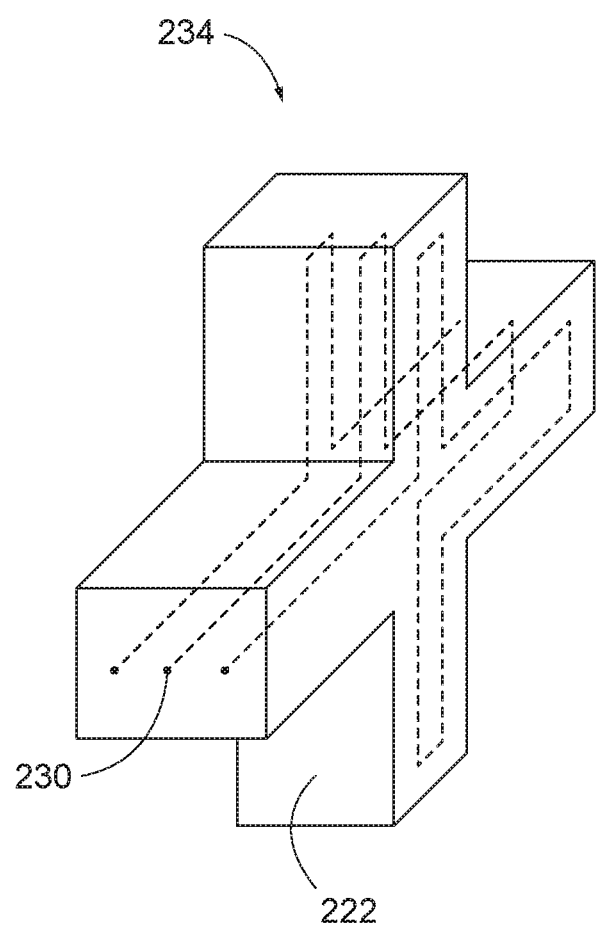
FIG. 17 is a front perspective view of an exemplary piece manufactured using one of the processes of FIG. 12 or 15, with dotted lines showing an internal structure.

FIG. 17 shows another example of a manufactured piece (232) that can be created using an additively manufactured substructure and a resin infusion or impregnation process. Several rows of poly-fibers (230) are embedded throughout the entire structure, with each fiber (230) having several changes in directionality throughout the structure. The remainder of the manufactured piece (232) is comprised of infused resin (222) added by a process such as a vacuum bag process or a mold based process. The ability to vary the directionality of poly-fibers (230) allows for the creation of substructures having complex or irregular shapes, as may be needed to create certain medical devise or components of medical devices.

Figure 18:
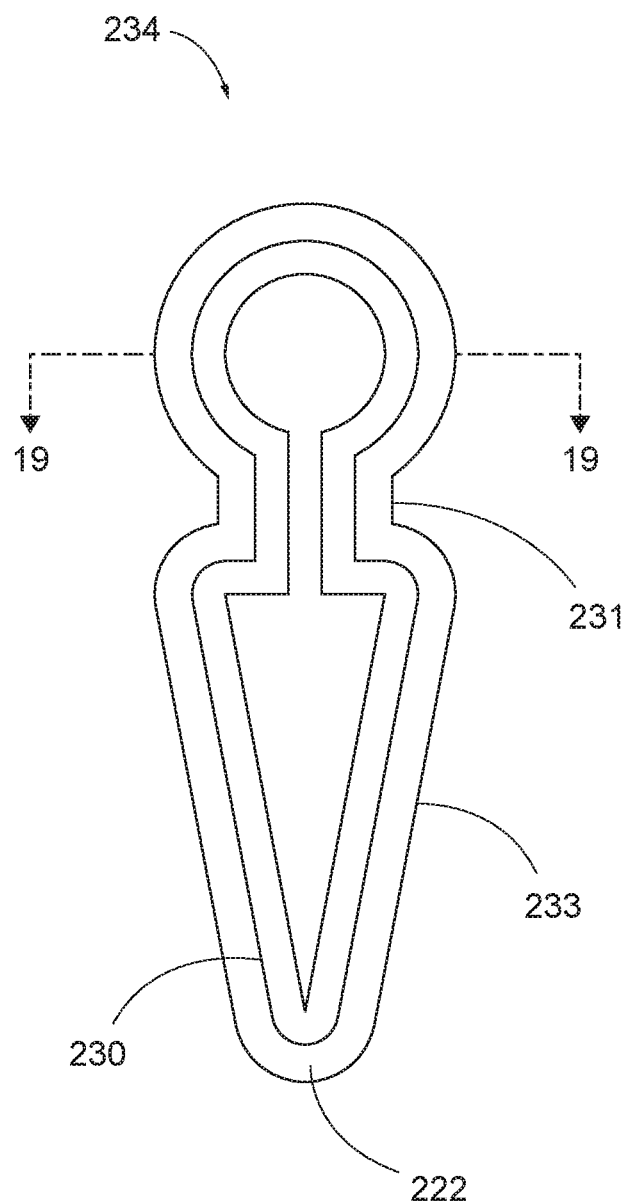
FIG. 18 is a side cross sectional view of another exemplary piece manufactured using one of the processes of FIG. 12 or 15, with solid lines showing an internal structure.
Figure 19:
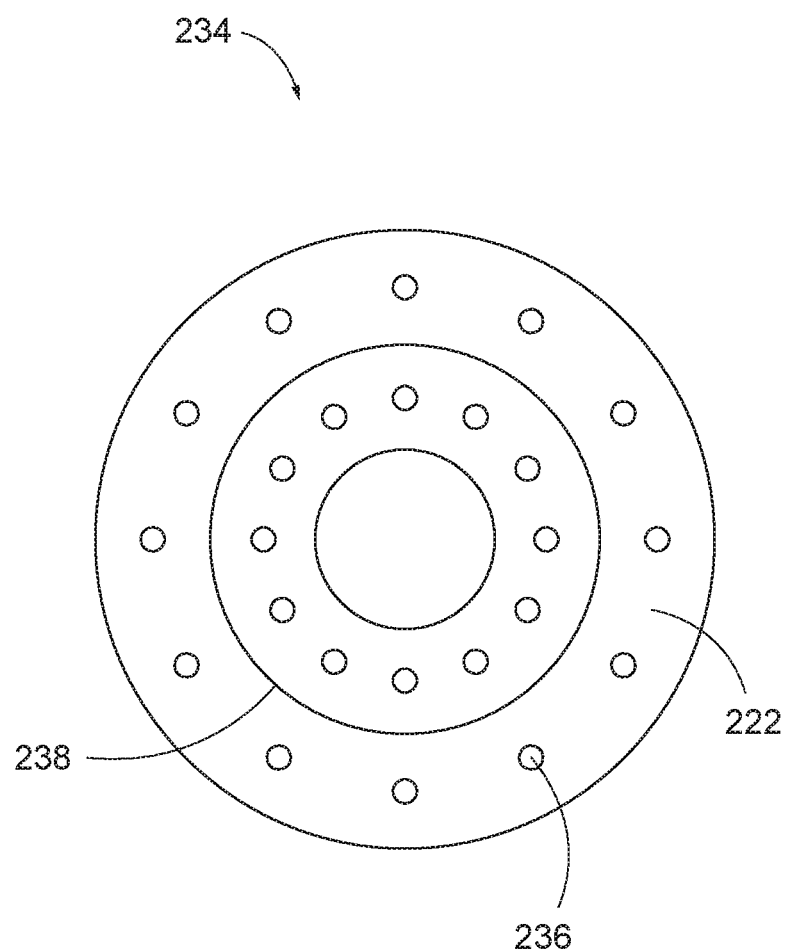
FIG. 19 is a top cross sectional view of the manufactured piece of FIG. 18 taken along line 19-19 of FIG. 18, with solid lines showing an internal structure.

FIGS. 18 and 19 show an additional example of a manufactured piece (234) that could be created using an embedded substructure and a resin infusion or impregnation process. A cross section of the manufactured piece (234) is shown, with several layers of embedded poly-fibers (230), and infused resin (222) filling in the interstitial spaces around the poly-fibers (230). The relatively low density of poly-fibers (230) throughout the body (233) allows for some flexibility, while the neck (231) has a relatively high density of poly-fibers (230) for durability so that neck (231) may withstand the stresses transferred through neck (231) while still remaining narrow enough for use.

FIG. 19 shows an overhead cross-sectional view along line 19-19 of the manufactured piece (234) of FIG. 18. From that view, it can be seen that a number of vertical poly-fibers (236) run along the vertical length of the manufactured piece (234), and a number of horizontal poly-fibers (238) run around the circumference of the manufactured piece (234), with infused resin (222) filling out the interstitial and surrounding spaces. As with previous examples, the changes of directionality in poly-fibers (230) shown in FIGS. 18 and 19 allow for much flexibility in the type of substructure produced by the additive manufacturing system (101) that will, when infused with resin, have an increased strength over a purely polymeric object or device having the same size and shape.

Figure 20:
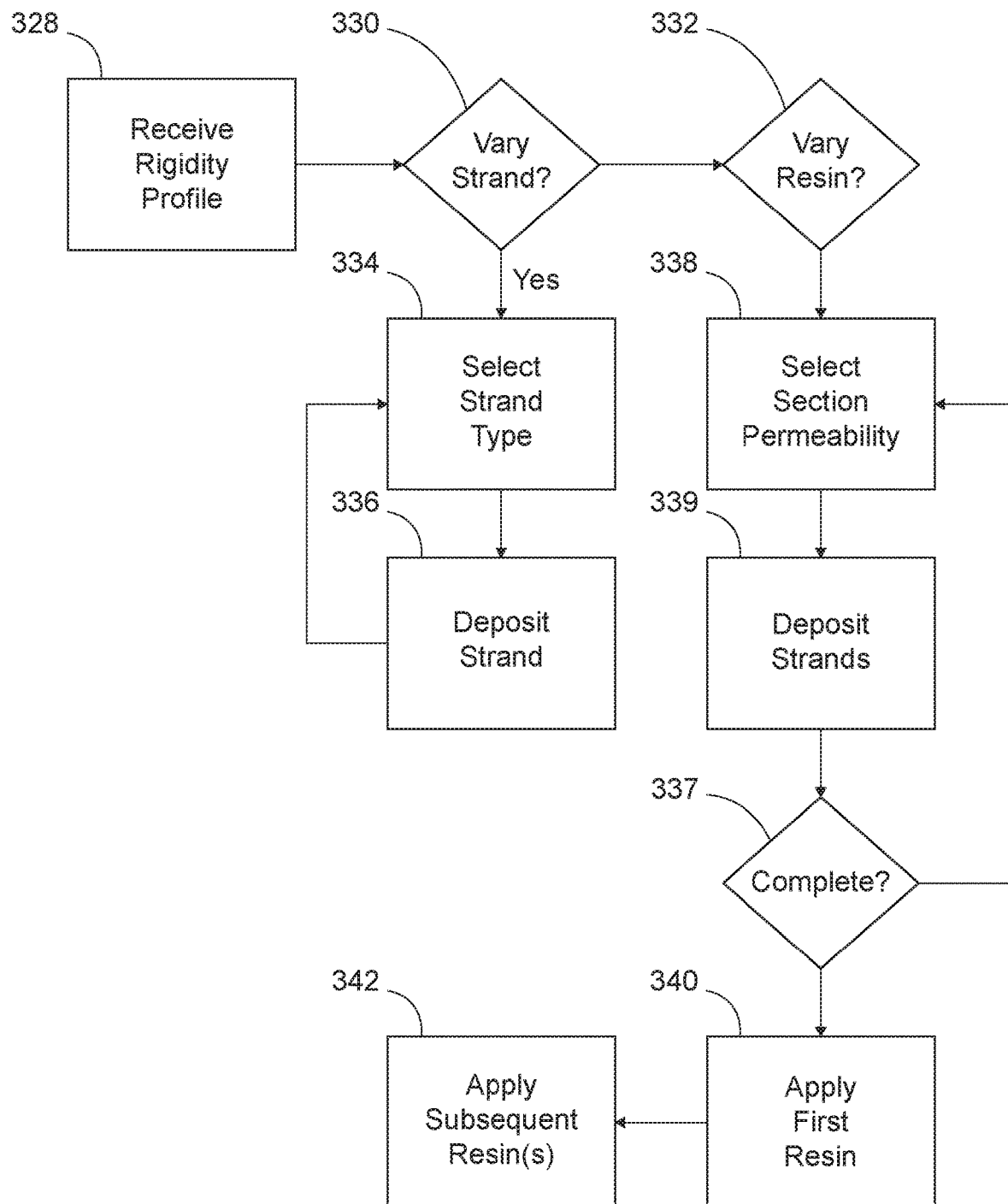
FIG. 20 shows an exemplary set of steps that could be performed by an additive manufacturing system to produce a manufactured piece with variable stiffness.

As already discussed, the additive manufacturing system (101) and techniques disclosed above allow for depositions of poly-thread with varying directionality, and a wide variation in possible substructure designs. Other advantages also exist and are possible to implement with the disclosed system and techniques. For example, FIG. 20 shows a set of steps that may be performed using the additive manufacturing system (101) and resin impregnation techniques to produce a manufactured piece that may have multiple zones throughout the piece, with each zone having its own unique rigidity profile. This could include, for example, zones that are very rigid in response to forces from all directions, zones that are very flexible in response to forces from all directions, zones that are variably flexible or rigid depending upon the direction a force is exerted from, or zones that allow for some level of twisting or rotation in certain directions but not others. This can be achieved by producing, via additive manufacturing, a substructure constructed from different types of poly-fiber or from a combination of poly-fiber and fiber-less filament strands, or by producing separate sections of interstitial space that may receive different types of resin or polymer during infusion or none at all, or both.

A rigidity profile may be a separate set of data from the part definition or may be a subset of the part definition, or both. The steps of FIG. 20 could be performed as part of manufacturing the substructure (block 302), after receiving the part definition (block 300), and receiving a rigidity profile (block 328). During the substructure manufacturing process (block 302), for each strand that is deposited, a determination will be made based upon the rigidity profile, the part definition, or both, whether to deposit a default strand type (e.g., poly-fiber), or to vary the deposited strand in some way (block 330).

If the strand type needs to be varied (block 330), based on the rigidity profile, the part definition, or both, an appropriate strand type may be selected (block 334) and readied for use. Strands could be selected in this way by one or more of strand type, by availability, by flexibility or rigidity requirement, or other factors. Strands could also be varied by, for example, using fibers of different diameters, using fibers having various construction (e.g., monofilament, twisted strands), fibers containing varying materials (e.g., having a semi-rigid core material, having a heat resistant outer material), or by coating the fibers with the same or varying polymers (e.g., selecting polymer coatings to increase or reduce adherence with each other when placed, regardless of the material the polymer coats). A different extrusion head (200) may be used to apply that strand, or the standard extrusion head (200) may be cleared of the default strand automatically or manually, and readied to deposit a different strand type. After the appropriate strand is selected (block 334), it may be deposited (block 336) on the substructure or at the manufacturing area, with these steps repeating until the substructure is complete. The additive manufacturing system (101) may deposit (block 336) strands differently based upon the selected type (block 334), for example, different levels of heating, different deposition speeds, or different methods of cutting may be used depending upon the particular strand type, in order to improve adherence, cut quality, or other characteristics for that particular strand type.

The type and permeation of resin can also be varied throughout a manufactured piece in order to provide different levels of rigidity in different sections. The resin impregnation may need to be varied (block 332) based upon the rigidity profile, the part definition, or both. For each section of the manufactured piece that has a variable resin impregnation, a permeability will be selected (block 338) for that section in relation to surrounding sections. This could include, for example, determining that a substructure wall between two sections that will be infused with the same type of resin should be permeable, or determining that a section of a substructure will not receive any resin during impregnation, and that the substructure walls surrounding that section should be impermeable. In this way, different sections of the substructure can be walled off from others, which will allow for a multi-stage resin impregnation process to impregnate different sections with different types of resin or polymer, or could allow for some sections of the substructure to remain hollow through one or more resin impregnation processes.

Once the permeability of a section has been selected (block 338), the strands for that section may be deposited (block 339), which may include arranging strands so that the section shares interstitial spaces (i.e., is permeable) with nearby sections, arranging strands so that the section does not share interstitial spaces with nearby sections (i.e., is impermeable), and may also include depositing strands to cap off certain sections so that they are initially impermeable, but could become permeable when the cap is removed during a multi-stage resin impregnation process. Capping or blocking off certain sections to make them temporarily impermeable may also be accomplished by using cap materials that can be dissolved or destroyed during the process rather than manually removed by a person. For example, this could include cap materials that could be dissolved in a certain solution, so that a multi-step resin impregnation process could include impregnating a first section with resin, dissolving one or more caps by placing the structure within a solution or filling or injecting the structure with a solution which will make a second section permeable, and then impregnating the now permeable sections with resin. While explained in the context of a structure having two sections, such techniques could support any needed number of sections that could be made permeable at different times during a resin impregnation process, providing great flexibility during the process. In addition to materials that could be fully or partially dissolved or destroyed by bathing in or filling with a solution, it is contemplated that materials could also be used that would react similarly to changes in temperatures (e.g., a section could become permeable when exposed to heat or cold as the cap material shrinks or expands), forced air (e.g., pressurized air could break a cap material without damaging nearby materials), or other materials that will be apparent to one of ordinary skill in the art in light of the disclosure herein.

Selection (block 338) and deposition (block 339) may repeat in this manner until the substructure is complete (block 337). Once the substructure is completed, a first resin may be applied (block 340), using a resin impregnation process as previously described, to a first set of sections. Subsequent resins may be applied (block 342) for substructures having different sections by uncapping or opening those sections during the resin impregnation process that those sections are to be filled during.

Figure 21:
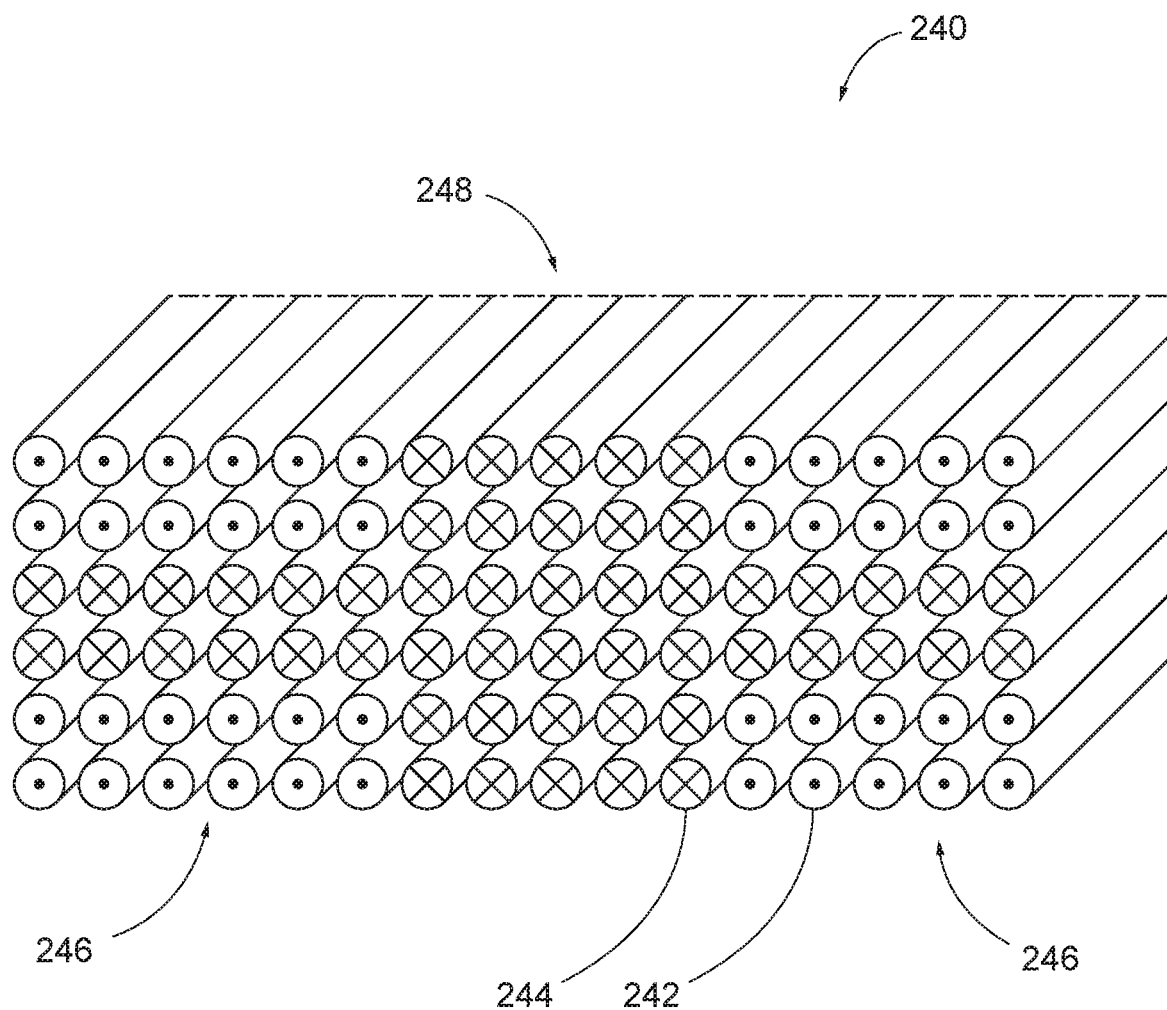
FIG. 21 is a cross-sectional view of an exemplary manufactured piece showing areas having variable stiffness based upon the rigidity of individual filaments used.

Using the described techniques for varying strand types and characteristics, and resin impregnation types and characteristics, allows for even more flexibility in creating parts. For example, FIG. 21 shows a cross section of an exemplary manufactured piece (240) made up of a plurality of fiber-poly strands having a rigid structure (242) and a plurality of polymer strands having a flexible structure (244). The concentration of relatively stiff poly-fiber strands (242) in the stiffened sections (246) at the four corners of the piece (240), and the concentration of relatively flexible polymer strands (244) in the flexible section (248) of the center of the piece (240) result in a part that is flexible through the middle and stiff at either end, such that the part will preferentially bend in the center while retaining its shape at either end. This allows for the creation of medical devices or components that, for example, have some flexibility in certain flexible sections (248) that are subjected to high forces during use, such that they may flex slightly rather than breaking or failing, while having stiffened sections (246) allow the device or component as a whole to have sufficient strength and durability for its intended purpose. These techniques may be useful for components that undergo high stresses that might cause failure in rigid components, and could include, for example, bone and structural implants for hips, shoulders, knees, and other joints.

Figure 22:
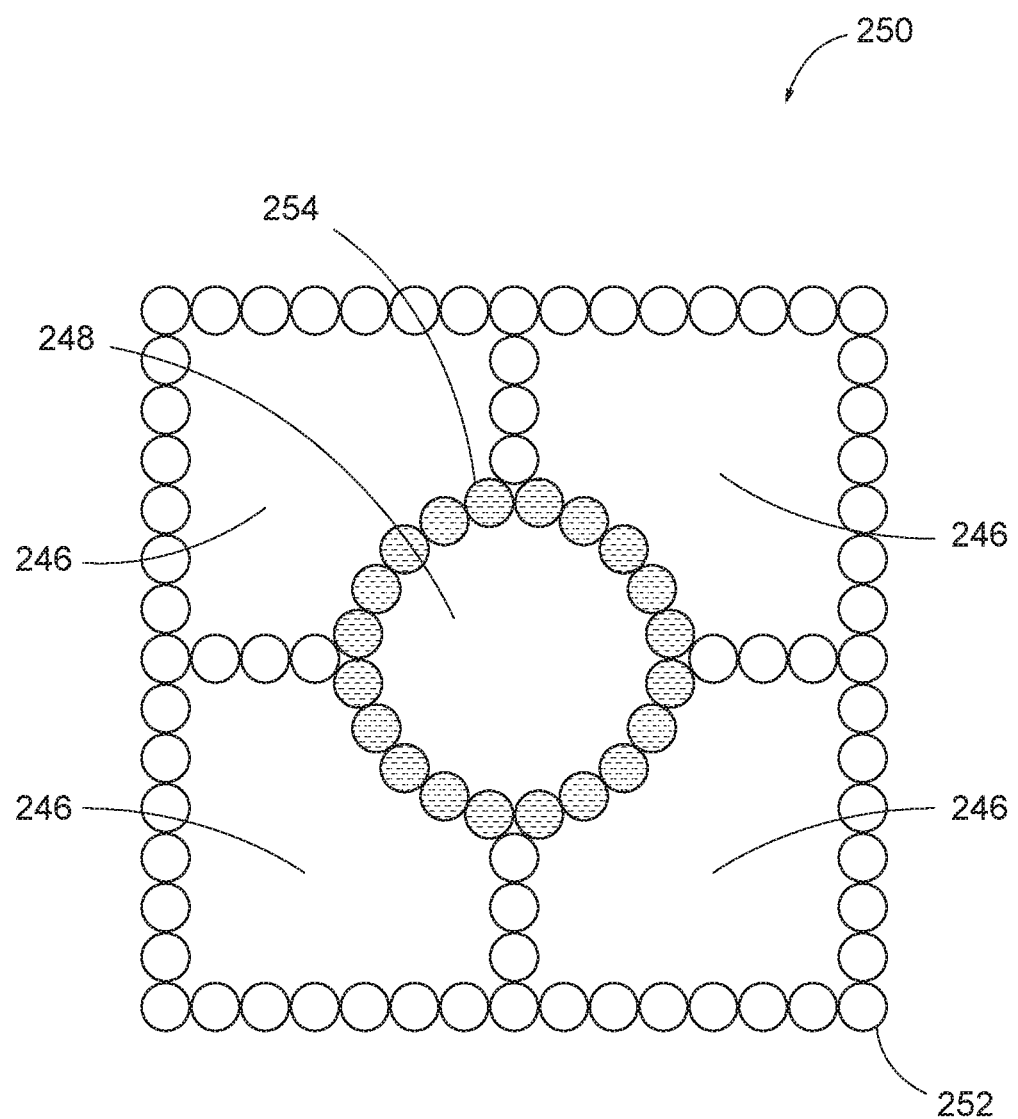
FIG. 22 is a cross sectional view of an exemplary manufactured piece showing areas having variable stiffness based upon the type or absence of resin used.

FIG. 22 shows a cross sectional view of another example of a manufactured piece (250) that could be created using the disclosed techniques for varying permeability of the created substructure. In this example, four outer sections of the substructure (250) are surrounded by strands that have been deposited to form permeable walls (252) having interstitial spaces that will allow resin to impregnate the interior. The result of performing a resin impregnation process with the shown substructure (250) is that the four permeable sections will take on resin during the impregnation process and form stiffened sections (246). The center of the substructure has a ring formed by threads that have been deposited to form impermeable walls (254) that will prevent resin from entering the interior area of the impermeable walls (254) during a resin impregnation process. The result is that after resin impregnation, the interior of the impermeable walls will form a flexible section (248). The resulting manufactured piece (250) will have a hollow core with some flexibility (254), surrounded by four stiffened sections (246) that will provide strength and durability. Alternately, rather than leaving the flexible section hollow (248), a multi-polymer impregnation process could be performed to fill the flexible section hollow (248) with a more flexible type of polymer or resin that will provide some strength when cured, but will still have relatively higher flexibility than the surrounding sections. As another alternative, the polymers used in the center section and the polymers used in the exterior sections could be reversed, so that a set of flexible sections surround a more rigid central section.

Figure 23A:
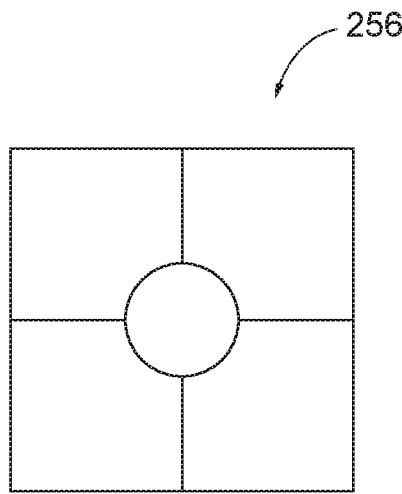
FIG. 23A is a cross sectional view of an exemplary manufactured piece showing an area having variable stiffness based upon the type or absence of resin used.
Figure 23B:
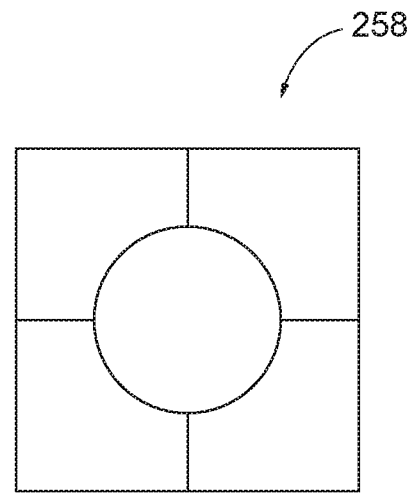
FIG. 23B is a cross sectional view of another exemplary manufactured piece showing an example of an area having variable stiffness based upon the type or absence of resin used.
Figure 23C:
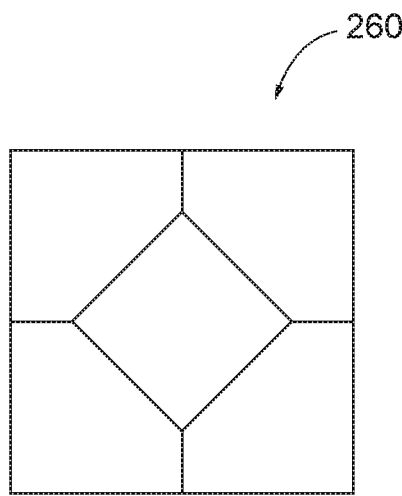
FIG. 23C is a cross sectional view of another exemplary manufactured piece showing an example of an area having variable stiffness based upon the type or absence of resin used.
Figure 23D:
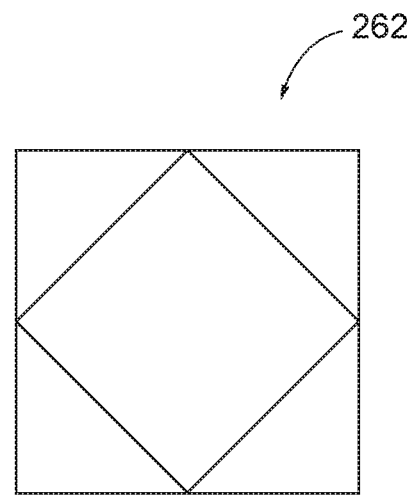
FIG. 23D is a cross sectional view of another exemplary manufactured piece showing an example of an area having variable stiffness based upon the type or absence of resin used.

FIGS. 23A-23D show additional examples of structures that could incorporated into manufactured pieces using both permeable and impermeable walls, as described above in relation to FIG. 22. For example, FIG. 23A shows a manufactured piece (256) with a central section having a smaller diameter than that shown in FIG. 22, while FIG. 23B shows a manufactured piece (258) with a central section having a larger diameter than that shown in FIG. 22. FIG. 23C shows a manufactured piece (260) with a quadrilateral center section with a small perimeter, surrounded by four outer sections, while FIG. 23D shows a manufactured piece (262) with a quadrilateral center section having a larger perimeter, such that right angles of the quadrilateral touch the outer wall of the manufactured piece (262). As with FIG. 22, any of the shown sections of the manufactured pieces (256, 258, 260, 262) may be filled with a specific type of resin, or left hollow, as may be desired, to create a manufactured piece having preferential flexibility in certain sections and in certain directions appropriate for its intended use. It is possible to create many types of structures beyond those explicitly shown in FIGS. 21, 22, and 23A-23D with the disclosed techniques for creating and resin impregnating substructures, and those pieces and their characteristics and advantages will be apparent to one of ordinary skill in the art in light of the disclosure herein.

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An additive manufacturing system comprising: (a) a polymer die comprising: (i) a fiber input, (ii) a heated polymer input, and (iii) a poly-fiber output, wherein the polymer die is operable to receive a fiber strand from the fiber input, coat the fiber strand with a polymer from the heated polymer input, and extrude a poly-fiber strand from the poly-fiber output; (b) a poly-fiber cutter positioned at the poly-fiber output and operable to cut the poly-fiber strand; (c) a positioning system operable to position and orient the poly-fiber output; (d) a control system comprising: (i) a processor, and (ii) memory, wherein the control system is configured to control the operation of the polymer die, the poly-fiber cutter, and the positioning system; and (e) a resin infusion system operable to fill interstitial spaces of an object with a liquid resin; wherein the control system is further configured to receive an object definition, wherein the object definition is comprised of a set of coordinates defining a structure for a manufactured piece, and, based on the object definition, operate the polymer die, the poly-fiber cutter, and the positioning system to extrude, cut, and deposit a plurality of poly-fiber strands to create the structure, and wherein the structure defines a set of interstitial spaces that, when infused with liquid resin by the resin infusion system and cured, are configured to produce the manufactured piece.

Example 2

The additive manufacturing system of Example 1, wherein the positioning system is operable to deposit an uninterrupted poly-fiber strand having one or more changes in directionality on the structure.

Example 3

The additive manufacturing system of any one or more of Examples 1 through 2, wherein the resin infusion system is of a type selected from the group consisting of a vacuum resin infusion system and a pressurized resin infusion system.

Example 4

The additive manufacturing system of any one or more of Examples 1 through 3, wherein the fiber strand is of a type selected from the group consisting of carbon, glass, and aramid.

Example 5

The additive manufacturing system of any one or more of Examples 1 through 4, wherein the manufactured piece is a medical device component.

Example 6

The additive manufacturing system of Example 5, wherein the medical device is of a type selected from the group consisting of an implant, a handle, a surgical material, and a grip.

Example 7

The additive manufacturing system of any one or more of Examples 1 through 6, wherein the plurality of poly-fiber strands of the structure are arranged to improve the strength of the manufactured piece.

Example 8

The additive manufacturing system of any one or more of Examples 1 through 7, wherein the structure further comprises a set of vertically disposed poly-fiber strand layers and a set of horizontally disposed poly-fiber strand layers.

Example 9

The additive manufacturing system of any one or more of Examples 1 through 8, wherein the control system is further configured to: (i) receive a rigidity profile and, based on the rigidity profile, determine two or more strand types to be deposited during creation of the structure, and (ii) extrude, cut, and deposit the two or more strand types on the structure, wherein the manufactured piece is capable of preferential bending at one or more locations due to the placement of the two or more strand types.

Example 10

The additive manufacturing system of Example 9, wherein the two or more strand types comprise a rigid strand and a flexible strand.

Example 11

The additive manufacturing system of Example 10, wherein a set of rigid strands are positioned at the exterior corners of the manufactured piece, wherein a set of flexible polymer strands are positioned at the center of the manufactured piece, and wherein the manufactured piece is configured to preferentially bend in the center under force.

Example 12

The additive manufacturing system of any one or more of Examples 9 through 11, wherein the two or more strand types comprise a substantially rigid poly-fiber strand and a flexible polymer strand.

Example 13

The additive manufacturing system of any one or more of Examples 1 through 13, wherein the control system is further configured to: (i) receive a rigidity profile and, based on the rigidity profile, determine two or more sections of the structure that should be separated by a resin impermeable wall, and (ii) extrude, cut, and deposit the plurality of poly-fiber strands to create the resin impermeable wall, and wherein, when the structure is infused with liquid resin, a first sections of the structure is infused with a first liquid resin and a second section of the structure is not infused with the first liquid resin, wherein the first section and the second section are separated by the resin impermeable wall.

Example 14

The additive manufacturing system of Example 13, wherein the second section of the structure is configured to be infused with a second liquid resin when the manufactured piece is produced.

Example 15

The additive manufacturing system of any one or more of Examples 13 through 14, wherein the second section of the structure is configured to remain hollow when the manufactured piece is produced.

Example 16

A method for producing an additively manufactured piece comprising the steps:

(a) producing a structure for a manufactured piece using an additive manufacturing system, the structure comprising a set of interstitial spaces; (b) placing a plurality of poly-fiber strands on the structure via the additive manufacturing system, wherein the act of placing a plurality of poly-fiber strands comprises: (i) extruding a poly-fiber strand, (ii) cutting the poly-fiber strand, and (iii) depositing the poly-fiber strand on the structure; (c) producing the manufactured piece by placing the structure in a resin infusion system and performing a resin infusion process, wherein the resin infusion system fills the set of interstitial spaces with a liquid resin; and (d) curing the manufactured piece.

Example 17

The method for producing an additively manufactured piece of Example 16, wherein the resin infusion process is a vacuum resin infusion process, and wherein the manufactured piece is produced without a casting mold.

Example 18

The method for producing an additively manufactured piece of any one or more of Examples 16 through 17, wherein the additive manufacturing system extrudes, cuts, and deposits a plurality of polymer strands, wherein the manufactured piece comprises the plurality of poly-fiber strands and the plurality of polymer strands, and wherein the manufactured piece preferentially bends in one or more directions based upon the placement of the plurality of polymer strands.

Example 19

The method for producing an additively manufactured piece of any one or more of Examples 16 through 18, wherein the structure comprises a permeable section and an impermeable section, wherein performing the resin infusion process causes the permeable section to be filled with the liquid resin, but does not cause the impermeable section to be filled with the liquid resin, and wherein the manufactured piece preferentially bends in one or more directions based upon the location of the impermeable section.

Example 20

An additive manufacturing system comprising: (a) a polymer die comprising: (i) a fiber input, (ii) a heated polymer input, and (iii) a poly-fiber output, wherein the polymer die is operable to receive a fiber strand from the fiber input, coat the fiber strand with a polymer from the heated polymer input, and extrude a poly-fiber strand from the poly-fiber output; (b) a poly-fiber cutter positioned at the poly-fiber output and operable to cut the poly-fiber strand; (c) a positioning system operable to position and orient the poly-fiber output; (d) a control system comprising: (i) a processor, and (ii) memory, wherein the control system is configured to control the operation of the polymer die, the poly-fiber cutter, and the positioning system; and (e) a resin infusion system operable to fill interstitial spaces of an object with a liquid resin; wherein the control system is configured to receive an object definition, wherein the object definition is comprised of a set of coordinates defining a structure for a medical device, and, based on the object definition, operate the polymer die, the poly-fiber cutter, and the positioning system to extrude, cut, and deposit a plurality of poly-fiber strands and a plurality of polymer strands to create the structure, wherein the plurality of poly-fiber strands comprises an uninterrupted poly-fiber strand having one or more changes in directionality, wherein the structure comprises a set of interstitial spaces that, when infused with liquid resin by the resin infusion system and cured, is configured to produce the medical device, and wherein the medical device is configured to preferentially bend in one or directions based upon the position of the plurality of polymer strands.

Example 21

The additive manufacturing system of Example 20, wherein the structure comprises a superstructure, a substructure within the superstructure, and at least one hollow within the superstructure.

Example 22

The additive manufacturing system of any of Examples 20-21, wherein the plurality of poly-fiber strands comprise a set of poly-fiber strands having varying diameters, a set of poly-fiber strands having varying materials, and a set of poly-fiber strands having varying polymer coatings.

Example 23

The additive manufacturing system of an of Examples 20-22, wherein the structure comprises a first section that is permeable, and a second section that is impermeable due to a cap, wherein the cap comprises a material that may be fully or partially dissolved in a solution to cause the second section to become permeable.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:
1. A method for producing a manufactured piece of a medical device, the method comprising:
 (a) extruding a poly-fiber strand;
 (b) cutting the poly-fiber strand;
 (c) arranging the poly-fiber strand to form a structure, wherein the structure comprises a permeable section and an impermeable section;

(d) infusing liquid resin into a plurality of interstitial spaces of the structure causing the permeable section to be filled with the liquid resin, but not causing the impermeable section to be filled with the liquid resin;

(e) curing the manufactured piece; and (f) incorporating the manufactured piece into the medical device, wherein the manufactured piece bends in one or more directions based upon a location of the impermeable section.

2. The method of claim 1, wherein infusing liquid resin further comprises infusing liquid resin under a vacuum such that the manufactured piece is produced without a casting mold.

3. The method of claim 1, wherein an additive manufacturing system extrudes, cuts, and deposits a plurality of polymer strands, wherein the poly-fiber strand comprises a plurality of poly-fiber strands, wherein the manufactured piece comprises the plurality of poly-fiber strands and the plurality of polymer strands, and wherein the manufactured piece bends in one or more directions based upon the act of depositing of the plurality of polymer strands.

4. The method of claim 1, the method further comprising, when producing the structure:

(a) causing a first portion of the structure that is associated with a first set of interstitial spaces to be configured for a first rigidity after infusing the liquid resin; and (b) causing a second portion of the structure that is associated with a second set of the set of interstitial spaces to be configured for a second rigidity after infusing the liquid resin.

5. An additive manufacturing method comprising:

(a) operating a filament extruder and a positioning system to produce a structure that includes a first set of interstitial spaces and a second set of interstitial spaces;

(b) varying a permeability of a portion of the structure in order to configure that portion of the structure to have a different subsequent rigidity; and (c) infusing resin into the first and second sets of interstitial spaces such that the first set of interstitial spaces have a first rigidity and the second set of interstitial spaces have a second rigidity that is greater than the first rigidity.

6. The additive manufacturing method of claim 5, further comprising producing the structure based upon an object definition that includes a set of coordinates defining the structure.

7. The additive manufacturing method of claim 5, further comprising producing the structure based upon a rigidity profile that describes and associates the first rigidity with the first set of interstitial spaces and the second rigidity with the second set of interstitial spaces.

8. The additive manufacturing method of claim 7, further comprising configuring the rigidity profile to cause the first rigidity to exhibit characteristics that include one or more of:

(i) rigidity in response to force from any direction, (ii) flexibility in response to from any direction, (iii) rigidity in response to force from a first set of directions and flexibility in response to force from a second set of directions, or (iv) a rotation in response to a force from one or more directions.

9. The additive manufacturing method of claim 5, further comprising, when producing the structure, varying a strand type of an output of the filament extruder in order to configure a portion of the structure for the first rigidity or the second rigidity.

10. The additive manufacturing method of claim 9, further comprising varying the strand type by changing from a prior strand type to:

(i) a poly-fiber strand, (ii) a fiber-less filament strand, (iii) a strand having a different diameter than the prior strand type, (iv) a strand having a different core material than the prior strand type, or (v) a strand having a different polymer coating than the prior strand type.

11. The additive manufacturing method of claim 5, further comprising varying the permeability of a portion of the structure by producing, with an output of the filament extruder, an impermeable barrier around the portion that prevents the resin from entering the portion during the resin infusion process.

12. The additive manufacturing method of claim 5, further comprising varying the permeability by producing, with the output of the filament extruder:

(i) an impermeable barrier around that portion that prevents a first liquid resin from entering the portion during a preceding infusion stage of the resin infusion process, and (ii) a cap within the impermeable barrier that, when removed after the preceding stage of the resin infusion process, allows a second liquid resin to enter that portion during a subsequent infusion stage of the resin infusion process.

13. The additive manufacturing method of claim 5, further comprising performing the resin infusion process to fill at least some of the first set of interstitial spaces with a liquid resin and produce a manufactured piece.

14. A method comprising storing, receiving, or transmitting a part definition, wherein the part definition is configured to cause an additive manufacturing system to:

(a) operate a poly-fiber filament extruder and a positioning system to produce a poly-fiber structure that includes first and second sets of interstitial spaces separated by a wall;

(b) infuse a first resin or polymer into the first set of interstitial spaces of the structure such that the first set of interstitial spaces have a first rigidity; and (c) subsequently infuse a second resin or polymer into the second set of interstitial spaces of the structure such that the second set of interstitial spaces have a second rigidity that is greater than the first rigidity.

15. The method of claim 14, further comprising storing, receiving, or transmitting the part definition that includes a rigidity profile that describes and associates the first rigidity with a first portion of the structure and the second rigidity with a second portion of the structure.

16. The method of claim 15, further comprising storing, receiving, or transmitting the rigidity profile that is configured to cause the additive manufacturing system to vary a strand type of the output of the filament extruder in order to configure a portion of the structure for the first rigidity or the second rigidity.

17. The method of claim 1, wherein infusing the liquid resin further comprises infusing the liquid resin into the plurality of interstitial spaces of only the permeable section of the structure.

18. The method of claim 5, wherein the structure is formed from a plurality of polymer coated fiber strands, the method further comprising incorporating the resin infused polymer coated fiber strands of the structure into a medical device.

19. The method of claim 14, further comprising applying a cap to the second set of interstitial spaces prior to infusing the first resin or polymer to prevent the first resin or polymer from flowing into the second set of interstitial spaces.

20. The method of claim 19, further comprising removing the cap to the second set of interstitial spaces after infusing the first resin or polymer.

\* \* \* \* \*